(12) United States Patent
Matsuyama

(10) Patent No.: US 6,269,419 B1
(45) Date of Patent: Jul. 31, 2001

(54) INFORMATION PROCESSING METHOD AND INFORMATION PROCESSING APPARATUS HAVING INTERRUPT CONTROL FUNCTION WITH PRIORITY ORDERS

(75) Inventor: Hideki Matsuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/243,781

(22) Filed: Feb. 3, 1999

(30) Foreign Application Priority Data

Feb. 4, 1998 (JP) .................................................. 10-023244

(51) Int. Cl.[7] ...................................................... G06F 13/26
(52) U.S. Cl. ............................ 710/269; 710/260; 710/264
(58) Field of Search ................................. 710/36, 48, 100, 710/107, 260, 264, 266, 269; 712/215, 244; 709/300

(56) References Cited

U.S. PATENT DOCUMENTS

| 4,349,873 | * | 9/1982 | Gunter et al. . | |
|---|---|---|---|---|
| 4,573,118 | * | 2/1986 | Damouny et al. . | |
| 5,081,574 | * | 1/1992 | Larsen et al. . | |
| 5,369,767 | | 11/1994 | Dinwiddie, Jr. et al. | 395/725 |

FOREIGN PATENT DOCUMENTS 690 31 093   1/1998  (DE) .

OTHER PUBLICATIONS

Kuck, David J., *The Structure of Computers and Computations*, vol. 1, John Wiley & Sons, Inc., 1978, pp 351–353.

* cited by examiner

Primary Examiner—Gopal C. Ray
(74) Attorney, Agent, or Firm—Foley & Lardner

(57) ABSTRACT

In an information processing apparatus, an interrupt control apparatus and method controls interrupt request inputs with respect to a processor. The interrupt control apparatus includes an interrupt flag holding circuit for holding a plurality of flags indicative of interrupt factors with respect to the respective interrupt request inputs and also holds a plurality of interrupt levels representative of priority orders of the interrupt request inputs. An interrupt level judging circuit judges an interrupt level having a top priority and also outputs an interrupt request to the processor. An interrupt vector generating circuit generates an interrupt vector in response to the held interrupt factor and an interrupt vector outputting circuit outputs the held interrupt vector to the processor. The processing operations by all of these circuits are carried out in a pipeline processing manner so that when an interrupt request having a higher interrupt level than that of an interrupt request under execution is issued, the processor interrupts the interrupt process operation under execution and executes an interrupt process operation for the higher interrupt level. When the interrupt process operation for the higher interrupt level is accomplished, the processor clears the interrupt level held in the interrupt level judging circuit and restarts the interrupt process operation for the lower interrupt level.

16 Claims, 11 Drawing Sheets

Fig.3

| cycle | IF stage | PRI stage | VCT stage | EXT stage | process by processor |
|---|---|---|---|---|---|
| 1 | save interrupt of pri7 | --- | --- | --- | --- |
| 2 | save interrupt of pri6 | issue REQ by pri7 | --- | --- | --- |
| 3 | save interrupt of pri5 | issue REQ by pri6 | generate vector of pri7 | --- | reject REQ(pri7) |
| 4 | save interrupt of pri4 | issue REQ by pri5 | generate vector of pri6 | output vector of pri7 | reject REQ(pri6) |
| 5 | save interrupt of pri1 | issue REQ by pri4 | generate vector of pri5 | output vector of pri6 | accept REQ(pri5) |
| 6 | save interrupt of pri3 / clear interrupt of pri5 | issue REQ by pri1 | generate vector of pri4 | output vector of pri5 | sample vector(pri5) |
| 7 | no interrupt request | issue REQ by pri1 | generate vector of pri1 | output vector of pri4 | service interrupt of pri4 |
| 8 | save interrupt of pri0 | issue REQ by pri1 | generate vector of pri1 | output vector of pri1 | service interrupt of pri1 |
| 9 | save interrupt of pri1 | issue REQ by pri0 | generate vector of pri1 | output vector of pri1 | service interrupt of pri5 |
| 10 | no interrupt request | issue REQ by pri0 | generate vector of pri0 | output vector of pri1 | accept REQ(pri0) |
| 11 | no interrupt request / clear interrupt of pri0 | issue REQ by pri1 | generate vector of pri0 | output vector of pri0 | sample vector(pri0) |
| 12 | no interrupt request | issue REQ by pri1 | generate vector of pri1 | output vector of pri0 | service interrupt of pri0 |
| 13 | no interrupt request | issue REQ by pri1 | generate vector of pri1 | output vector of pri1 | service interrupt of pri0 |
| 14 | no interrupt request | issue REQ by pri1 | generate vector of pri1 | output vector of pri1 | service interrupt of pri1 |
| 15 | no interrupt request | issue REQ by pri1 | generate vector of pri1 | output vector of pri1 | service interrupt of pri1 |
| 16 | no interrupt request | issue REQ by pri1 | generate vector of pri1 | output vector of pri1 | service interrupt of pri1 |
| 17 | no interrupt request / clear interrupt of pri1 | issue REQ by pri2 | generate vector of pri1 | output vector of pri1 | accept REQ(pri1) |
| 18 | no interrupt request | issue REQ by pri2 | generate vector of pri2 | output vector of pri1 | sample vector(pri1) |
| 19 | no interrupt request | issue REQ by pri2 | generate vector of pri2 | output vector of pri2 | service interrupt of pri1 |

Fig. 5

| default value | interrupt level | interrupt request input |
|---|---|---|
| 0 | pri7 | INT_0 |
| 1 | pri6 | INT_1 |
| 2 | pri5 | INT_2 |
| 3 | pri4 | INT_3 |
| 4 | pri3 | INT_4 |
| 5 | pri2 | INT_5 |
| 6 | pri1 | INT_6 |
| 7 | pri0 | INT_7 |
| 8 | pri7 | INT_8 |
| 9 | pri6 | INT_9 |
| 10 | pri5 | INT_10 |
| 11 | pri4 | INT_11 |
| 12 | pri3 | INT_12 |
| 13 | pri2 | INT_13 |
| 14 | pri1 | INT_14 |
| 15 | pri0 | INT_15 |

*Fig.11 (PRIOR ART)*

| cycle | IF stage | PRI stage | VCT stage | EXT stage | process by processor |
|---|---|---|---|---|---|
| 1 | save interrupt of pri7 | ------ | ------ | ------ | ------ |
| 2 | save interrupt of pri6 | issue REQ by pri7 | ------ | ------ | ------ |
| 3 | save interrupt of pri5 | issue REQ by pri7 | generate vector of pri7 | ------ | ------ |
| 4 | save interrupt of pri4 | issue REQ by pri7 | ------ | output vector of pri7 | reject REQ(pri7) |
| 5 | save interrupt of pri1 | issue REQ by pri7 | ------ | output vector of pri7 | reject REQ(pri7) |
| 6 | save interrupt of pri3 / clear interrupt of pri7 | issue REQ by pri7 | ------ | output vector of pri7 | accept REQ(pri7) |
| 7 | no interrupt request | issue REQ by pri1 | ------ | ------ | sample vector(pri7) |
| 8 | save interrupt of pri0 | issue REQ by pri1 | generate vector of pri1 | ------ | service interrupt of pri7 |
| 9 | save interrupt of pri2 | issue REQ by pri1 | ------ | output vector of pri1 | service interrupt of pri7 |
| 10 | no interrupt request | issue REQ by pri1 | ------ | output vector of pri1 | service interrupt of pri7 |
| 11 | no interrupt request / clear interrupt of pri1 | issue REQ by pri1 | ------ | output vector of pri1 | accept REQ(pri1) |
| 12 | no interrupt request | issue REQ by pri0 | ------ | ------ | sample vector(pri1) |
| 13 | no interrupt request | issue REQ by pri0 | generate vector of pri0 | ------ | service interrupt of pri1 |
| 14 | no interrupt request | issue REQ by pri0 | ------ | output vector of pri0 | service interrupt of pri1 |
| 15 | no interrupt request | issue REQ by pri0 | ------ | output vector of pri0 | service interrupt of pri1 |
| 16 | no interrupt request | issue REQ by pri0 | ------ | output vector of pri0 | service interrupt of pri1 |
| 17 | no interrupt request / clear interrupt of pri0 | issue REQ by pri2 | ------ | output vector of pri0 | accept REQ(pri0) |
| 18 | no interrupt request | issue REQ by pri2 | ------ | ------ | sample vector(pri0) |
| 19 | no interrupt request | issue REQ by pri2 | generate vector of pri2 | ------ | service interrupt of pri0 |

INFORMATION PROCESSING METHOD AND INFORMATION PROCESSING APPARATUS HAVING INTERRUPT CONTROL FUNCTION WITH PRIORITY ORDERS

BACKGROUND OF THE INVENTION

1. Field of the Invention

The present invention generally relates to an information processing method and an information processing apparatus. More specifically, the present invention is directed to an interrupt control method, and an interrupt control apparatus controlling a plurality of interrupt requests by applying priority orders, or priority degrees to these interrupt requests.

2. Description of the Related Art

When an interrupt process occurs while a main process operation is executed by a processor, this processor temporarily interrupts the main process operation under execution, and executes the interrupt process. In the case that such interrupts are produced in a multiple manner, since the processor cannot simultaneously execute a plurality of interrupts, the processor is required to perform an interrupt control in such a manner that the processor applies priority orders, or priority degrees to these plural interrupts, and then sequentially executes the interrupt processes having the higher priority orders.

A typical interrupt process operation executed by one conventional information processing apparatus is described as follows: FIG. 9 is a schematic block diagram for representing an arrangement of a conventional interrupt control apparatus. FIG. 10 is a timing chart for explaining a control operation executed by this conventional interrupt control apparatus. FIG. 11 is a state transition diagram for indicating state changes in the respective structural arrangement units of this conventional interrupt control apparatus.

As indicated in FIG. 9, the conventional interrupt control apparatus is mainly arranged by an interrupt flag holding circuit 11, an interrupt level holding circuit 12, an interrupt level judging circuit 13, an interrupt factor holding circuit 14, an interrupt vector generating circuit 15, and an interrupt vector holding circuit 16. When an interrupt request is entered, the interrupt flag holding circuit 11 sets a flag in correspondence with the entered interrupt request, and further holds an interrupt level. The interrupt level holding circuit 12 holds an interrupt level of an interrupt request under execution by a processor. The interrupt level judging circuit 13 judges such an interrupt level having a top priority order among the interrupt levels held in the interrupt flag holding circuit 11, and outputs an interrupt factor corresponding thereto. The interrupt factor holding circuit 14 holds the interrupt factor outputted from the interrupt level judging circuit 13. The interrupt vector generating circuit 15 generates such an interrupt vector indicative of an interrupt sort in response to the interrupt factor outputted from the interrupt level judging circuit 13. The interrupt vector holding circuit 16 holds the generated interrupt vector, and outputs the held interrupt vector to the processor 17.

Next, the interrupt processing operation executed in the above-explained conventional information processing apparatus will be described with reference to FIG. 9 to FIG. 11. Since this interrupt processing operation is sequentially advanced every 1 cycle of a clock CLK, state changes of the respective circuits will be explained as to interrupt processing operations for 19 cycles. In the drawings, an IF stage (interrupt flag holding stage) indicates an operation cycle of the interrupt flag holding circuit 11; a PRI stage (interrupt level judging stage) shows an operation cycle of the interrupt level judging circuit 13; a VCT stage (interrupt vector generating stage) represents an operation cycle of the interrupt vector generating circuit 15; and an EXT cycle (interrupt vector output stage) denotes an operation cycle of the interrupt vector holding circuit 16. It should be understood that symbols "pri0" to "pri7" show interrupt priority orders (degrees), and a relationship among these interrupt priority orders is defined by as follows:

pri0>pri1>pri2>pri3>pri4>pri5>pri6>pri7

The interrupt processing operations of the conventional information processing apparatus are executed in accordance with the following cycles:

(1) 1st Cycle

Assuming now that an interrupt request having a priority order "pri7" is issued in any one of interrupt request inputs INT-0 to INT-x under such a condition that all of the contents of the interrupt flag holding circuit 11 and of the interrupt level holding circuit 12 are cleared, a flag is set to the interrupt flag holding circuit 11 in the IF stage (this state is indicated as "IF7").

(2) 2nd Cycle

Next, in the PRI stage, the interrupt level held in the interrupt flag holding circuit 11 is read, and the read interrupt level is judged by the interrupt level judging circuit 13. At such a present time when only one interrupt request is issued, since the priority order pri7 is the highest order, the interrupt factor of pri7 is held in the interrupt factor holding circuit 14, and also an interrupt request "REQ" based upon pri7 is outputted to the processor 17 from the interrupt level judging circuit 13 via an interrupt request signal line INTRQ (this state is indicated as "PRI7"). At this time, since an interrupt request having a priority order "pri6" is issued, a flag is set to the interrupt flag holding circuit 11 in the IF stage (this state is indicated as "IF6").

(3) 3rd Cycle

While the interrupt request REQ based on pri7 is issued from the interrupt level judging circuit 13 to the processor 17, this processor 17 is set to such a state for rejecting the interrupt request REQ based on pri7. At this time, at a VCT stage, the interrupt vector generating circuit 15 generates an interrupt vector by the interrupt factor read from the interrupt factor holding circuit 14, and the generated interrupt vector of pri7 is held in the interrupt vector holding circuit 16 (this state is indicated as "VCT7"). Also, in the IF stage, since an interrupt request having a priority order of "pri5" is issued, a flag is set to the interrupt flag holding circuit 11 (this state is indicated as "IF5").

(4) 4th Cycle

Subsequently, while the interrupt request REQ based on pri7 is issued from the interrupt level judging circuit 13 to the processor 17, this processor 17 is set to such a state for rejecting the interrupt request REQ based on pri7. At this time, at an EXT stage, the interrupt vector based upon pri7 held in the interrupt vector holding circuit 16 is read to an interrupt vector signal line INTLV (this state is indicated as "EXT7"). Also, in the IF stage, since an interrupt request having a priority order of "pri4" is issued, a flag is set to the interrupt flag holding circuit 11 (this state is indicated as "IF4").

(5) 5th Cycle

Subsequently, the interrupt request REQ based upon pri7 is outputted from the interrupt level judging circuit 13, and further an interrupt vector based on pri7 held in the interrupt vector holding circuit 16 is read. Since the processor 17 is capable of executing an interrupt process operation, this processor 17 can accept an interrupt request REQ with respect to this interrupt. At this time, since the interrupt request based upon the priority order of "pri1" is issued, a flag is set to the interrupt flag holding circuit 11 in the IF stage (this state is indicated as "IF1").

(6) 6th Cycle

Subsequently, the interrupt request REQ based upon pri7 is outputted from the interrupt level judging circuit 13, and also the interrupt vector bases on pri7 held in the interrupt vector holding circuit 16 is read. The processor 17 samples the interrupt vector based on pri7 to branch the sampled interrupt vector to a target. The processor 17 commences an interrupt service of pri7 by performing an interrupt process operation in an interrupt process routine, and further returns an interrupt acknowledge AK to the interrupt flag holding circuit 11 via an interrupt acknowledge signal line INTAK. As a result, the interrupt flag based on pri7 held in the interrupt flag holding circuit 11 is cleared, and also the interrupt level having the priority order of pri7 held in the interrupt level holding circuit 12 is cleared. At this time, in the IF stage, since an interrupt request having a priority order of "pri3" is issued, a flag is set to the interrupt flag holding circuit 11 (this state is indicated as "IF3").

(7) 7th Cycle

The interrupt levels of the interrupt requests except for the interrupt request based on pri7 are read from the interrupt flag holding circuit 11, and then these read interrupt levels are judged by the interrupt level judging circuit 13. Since the priority order of pri1 is the highest priority order, the interrupt factor of pri1 is held in the interrupt factor holding circuit 14, and further an interrupt request REQ based upon pri1 is outputted from the interrupt level judging circuit 13 (this state is indicated as "PRI1"). The processor 17 continues the service of the interrupt based on pri7. At this time, since no interrupt request is issued, the state of the interrupt flag holding circuit 11 is not changed in the IF stage (this state is indicated as "IF").

(8) 8th Cycle

Subsequently, the interrupt request REQ based on pri1 is outputted from the interrupt level judging circuit 13 to the processor 17, and also an interrupt vector is generated by the interrupt vector generating circuit 15 based upon the interrupt factor read from the interrupt factor holding circuit 14. Then, the generated interrupt vector based on pri1 is held into the interrupt vector holding circuit 16 (this state is indicated as "VCT1"). At this time, since an interrupt request having a priority order of "pri0" is issued, a flag is set to the interrupt flag holding circuit 11 in the IF stage (this state is indicated as "IF0").

(9) 9th Cycle

Subsequently, the interrupt request REQ based upon pri1 is outputted from the interrupt level judging circuit 13, and also the interrupt vector based on pri1 held in the interrupt vector holding circuit 16 is read (this state is indicated as "TXT1"). The processor 17 continues a service corresponding to the interrupt of pri7. At this time, since an interrupt request having a priority order of "pri2" is issued, a flag is set to the interrupt flag holding circuit 11 in the IF stage (this state is indicated as "IF2").

(10) 10th Cycle

Subsequently, the interrupt request REQ based upon pri1 is outputted from the interrupt level judging circuit 13, and also the interrupt vector based on pri1 held in the interrupt vector holding circuit 16 is read. Since processor 17 is capable of the interrupt process, the processor 17 can accept the interrupt request REQ with respect to the interrupt of pri1. Thereafter, since the interrupt request is not issued, the state of the interrupt flag holding circuit 11 is not changed at the IF stage (this stage is indicated as "IF").

(11) 11th Cycle

Subsequently, the interrupt request REQ based upon pri1 is outputted from the interrupt level judging circuit 13, and also the interrupt vector based on pri1 held in the interrupt vector holding circuit 16 is read. The processor 17 samples the interrupt vector based on pri1 to commence an interrupt service of pri1. The processor returns an interrupt acknowledge AK to the interrupt flag holding circuit 11 via the interrupt acknowledge signal line INTAK. As a result, the interrupt flag based on pri1 held in the interrupt flag holding circuit 11 is cleared, and also the interrupt level having the priority order of pri1 held in the interrupt level holding circuit 12 is cleared.

(12) 12th Cycle

In this cycle, while the interrupt request REQ based on pri0 is outputted from the interrupt level judging circuit 13 to the processor 17, this processor 17 continues the interrupt service of pri1. The interrupt levels of the interrupt request based on pri1 are read from the interrupt flag holding circuit 11, and then these read interrupt levels are judged by the interrupt level judging circuit 13. Since the priority order of pri0 is the highest (top) priority order, the interrupt factor of pri0 is held in the interrupt factor holding circuit 14 (this state is indicated as "PRI0").

(13) 13th Cycle

Subsequently, the interrupt request REQ based upon pri0 is outputted from the interrupt level judging circuit 13 to the processor 17, and also the processor 17 continues the interrupt service of pri1. The interrupt vector is generated based on the interrupt factor read from the interrupt factor holding circuit 14, and then the generated interrupt vector of pri0 is held in the interrupt vector holding circuit 16 (this state is indicated as "VCT0").

(14) 14th Cycle

Subsequently, the interrupt request REQ based upon pri0 is outputted from the interrupt level judging circuit 13 to the processor 17, and also the processor 17 continues the interrupt service of pri1. The interrupt vector of pri0 held in the interrupt vector holding circuit 16 is read (this state is indicated as "EXT0").

(15) 15th Cycle

Subsequently, the interrupt request REQ based upon pri0 is outputted from the interrupt level judging circuit 13 to the processor 17, and also the processor 17 continues the interrupt service of pri1. The interrupt vector of pri0 is held in the interrupt vector holding circuit 16 is read.

(16) 16th Cycle

Subsequently, in this cycle the interrupt request REQ based upon pri0 is outputted from the interrupt level judging circuit 13, and also the processor 17 can execute the interrupt process operation. As a result, the processor 17 can accept the interrupt request REQ with respect to the interrupt of pri0. Also, the read vector of pri0 held in the interrupt vector holding circuit 16 is read.

(17) 17th Cycle

Subsequently, in this cycle, the interrupt request REQ based upon pri0 is outputted from the interrupt level judging circuit 13, and also the interrupt vector base on pri0 held in the interrupt vector holding circuit 16 is read. The processor 17 samples the interrupt vector based on pri0 to commence an interrupt service of pri0, and further returns an interrupt acknowledge AK to the interrupt flag holding circuit 11. As a result, the interrupt flag based on pri0 held in the interrupt flag holding circuit 11 is cleared, and also the interrupt level having the priority order of pri0 held in the interrupt level holding circuit 12 is cleared.

(18) 18th Cycle

In this cycle, the interrupt request REQ based upon pri2 is, outputted from the interrupt level judging circuit 13 to the processor 17, and also the processor 17 continues the interrupt service of pri0. The interrupt levels of the interrupt requests except for the interrupt request based on pri0 are read from the interrupt flag holding circuit 11, and then these read interrupt levels are judged by the interrupt level judging circuit 13. Since the priority order of pri2 is the highest priority order, the interrupt factor of pri2 is held in the interrupt factor holding circuit 14 (this state is indicated as "PRI2").

(19) 19th Cycle

Subsequently, in this cycle, the interrupt request REQ based upon pri2 is outputted from the interrupt level judging circuit 13 to the processor 17, and also the processor 17 continues the interrupt service of pri0. The interrupt vector is generated based on the interrupt factor read from the interrupt factor holding circuit 14, and then the generated interrupt vector of pri2 is held in the interrupt vector holding circuit 16 (this state is indicated as "VCT2").

However, the above-explained conventional information processing apparatus has a problem that the interrupt response characteristic with respect to the interrupt requests having the high priority orders is deteriorated.

This reason is as follows. In this conventional information processing apparatus, when the interrupt factor is applied, the interrupt control apparatus judges the priority orders. When the judgement of the priority orders is accomplished by the interrupt control apparatus, this interrupt control apparatus outputs the interrupt request signal to the processor, and thereafter generates the interrupt vector. At this time, the interrupt state is maintained in order that the interrupt priority orders are not changed. Since maintaining such an interrupt state, the corresponding relationship between the inputted interrupt requests and the outputted interrupt vectors can be established. Also, the judgement of the priority orders and the generation of the interrupt vectors need not be carried out within 1 clock.

However, even when such an interrupt which is applied after the interrupt factor has been defined owns a higher priority order than that of the defined interrupt factor, the first-mentioned interrupt having the higher priority order cannot be accepted until the once defined interrupt is accepted by the processor. As a consequence, the interrupt vector sampled by the processor corresponds to such an interrupt vector when the interrupt control apparatus has outputted the interrupt request signal to the processor before the processor will sample this interrupt vector. Therefore, a problem that results is the delayed processing of the higher priority interrupt.

SUMMARY OF THE INVENTION

The present invention has been made to solve the above-described problem, and therefore, has an object to provide an information processing method and an information processing apparatus capable of improving an interrupt response characteristic with respect to an interrupt factor of a high priority order.

To achieve the above-described object, an interrupt control method, according to a first aspect of the present invention, is featured by such an interrupt control method used in an information processing method, comprising:

a first step for holding a plurality of flags indicative of interrupt factors with respect to the respective interrupt request inputs and also for holding a plurality of interrupt levels representative of priority orders of the interrupt request inputs;

a second step for judging such an interrupt level having a top priority order by checking the held interrupt levels to thereby hold such an interrupt factor having the judged interrupt level, and also for outputting an interrupt request to a processor of an information processing apparatus;

a third step for generating an interrupt vector in response to the held interrupt factor; and a fourth step for outputting the held interrupt vector to the processor; wherein:

the first to fourth steps are carried out in a pipeline processing manner so as to control the interrupt requests with respect to the processor, whereby when an interrupt request having a higher interrupt level than that of an interrupt request under process is issued, the processor interrupts the interrupt process operation under execution and then executes an interrupt process operation for the higher interrupt level, whereas when the interrupt process operation for the higher interrupt levels is accomplished, the processor clears the interrupt level held in the second step and then restarts the interrupt process operation for the lower interrupt level.

Also, an interrupt control method, according to a second aspect of the present invention, is featured by such an interrupt control method used in an information processing method, comprising:

a first step for holding a plurality of flags indicative of interrupt factors with respect to the respective interrupt request inputs and also for holding a plurality of interrupt levels representative of priority orders of the interrupt request inputs;

a second step for judging such an interrupt level having a top priority order by checking the held interrupt levels to thereby hold such an interrupt factor having the judged interrupt level, and also for outputting an interrupt request to a processor of an information processing apparatus;

a third step for judging priority orders based upon default values indicative of sequence numbers of the interrupt request inputs with respect to the held interrupt factors, and also for generating an interrupt vector in response to such an interrupt factor having a top priority order to thereby hold the generated interrupt vector; and a fourth step for outputting the held interrupt vector to the processor; wherein:

the first to fourth steps are carried out in a pipeline processing manner so as to control the interrupt requests with respect to the processor, whereby when an interrupt request having a higher interrupt level than that of an interrupt request under process is issued, the processor interrupts the interrupt process operation under execution and then executes an interrupt process operation for the higher interrupt level, whereas when the interrupt process operation for the higher interrupt levels is accomplished, the processor clears the interrupt level held in the second step and then restarts the interrupt process operation for the lower interrupt level.

Furthermore, in the interrupt control method as recited in the first, or second aspect, the first to fourth steps are carried out in the pipeline processing manner every 1 clock.

Also, this interrupt control method is further comprised of;

a fifth step for holding an interrupt level of an interrupt request under process by the processor, and also for clearing an interrupt level of such an interrupt request, which has been processed by the processor when an interrupt request acknowledge signal is applied from the processor; wherein:

in the second step, such an interrupt request having a top priority order is judged among the plural interrupt requests having the interrupt levels, which are held in the first step, except for an interrupt request having an interrupt level lower than that of the interrupt request under process by the processor.

Moreover, to achieve the above-described object, an interrupt control apparatus, according to a third aspect of the present invention, is featured by such an interrupt control apparatus used in an information processing apparatus comprising: interrupt flag holding means for holding a plurality of flags indicative of interrupt factors with respect to the respective interrupt request inputs and also for holding a plurality of interrupt levels representative of priority orders of the interrupt request inputs;

interrupt level judging means for judging such an interrupt level having a top priority order by checking the held interrupt levels to thereby hold such an interrupt factor having the judged interrupt level, and also for outputting an interrupt request to a processor of the information processing apparatus;

interrupt vector generating means for generating an interrupt vector in response to the held interrupt factor; and interrupt vector generating means for outputting the held interrupt vector to the processor; wherein:

the processing operations by all of the means are carried out in a pipeline processing manner so as to control the interrupt requests with respect to the processor, whereby when an interrupt request having a higher interrupt level than that of an interrupt request under process is issued, the processor interrupts the interrupt process operation under execution and then executes an interrupt process operation for the higher interrupt level, whereas when the interrupt process operation for the higher interrupt levels is accomplished, the processor clears the interrupt level held in the interrupt level judging means and then restarts the interrupt process operation for the lower interrupt level.

Similarly, an interrupt control apparatus, according to a fourth aspect of the present invention, is featured by such an interrupt control apparatus used in an information processing apparatus comprising: interrupt flag holding means for holding a plurality of flags indicative of interrupt factors with respect to the respective interrupt request inputs and also for holding a plurality of interrupt levels representative of priority orders of the interrupt request inputs;

interrupt level judging means for judging such an interrupt level having a top priority order by checking the held interrupt levels to thereby hold such an interrupt factor having the judged interrupt level, and also for outputting an interrupt request to a processor of the information processing apparatus;

default priority order judging/interrupt vector generating means for judging priority orders based upon default values indicative of sequence numbers of the interrupt request inputs with respect to the held interrupt factors, and also for generating an interrupt vector in response to such an interrupt factor having a top priority order to thereby hold the generated interrupt vector; and interrupt vector outputting means for outputting the held interrupt vector to the processor; wherein:

the process operations by all of the means are carried out in a pipeline processing manner so as to control the interrupt requests with respect to the processor, whereby when an interrupt request having a higher interrupt level than that of an interrupt request under execution is issued, the processor interrupts the interrupt process operation under execution and then executes an interrupt process operation for the higher interrupt level, whereas when the interrupt process operation for the higher interrupt levels is accomplished, the processor clears the interrupt level held in the interrupt level judging means and then restarts the interrupt process operation for the lower interrupt level.

Also, in the interrupt control apparatus a recited in the third, or fourth aspect of the present invention, the processing operations by all of the means are carried out in the pipeline processing manner every 1 clock.

Also, the interrupt control apparatus, as recited in the third, or fourth aspect of the present invention, is featured by further comprising;

interrupt level holding means for holding an interrupt level of an interrupt request under process by the processor, and also for clearing an interrupt level of such an interrupt request, which has been processed by the processor when an interrupt request acknowledge signal is applied from the processor; wherein:

the interrupt level judging means is arranged in such a way that an interrupt request having a top priority order is judged among the plural interrupt requests having the interrupt levels, which are held in the interrupt level holding means, except for an interrupt request having an interrupt level lower than that of the interrupt request under process by the processor.

Furthermore, the interrupt control apparatus, as recited in the fourth aspect of the present invention, is featured by that the default priority order judging/interrupt vector generating means is arranged by at least a first circuit group, a second circuit group, and a third circuit group; and interrupt request input series are connected to an input of the first circuit group and arranged in such a manner that the priority orders of the default values are sequentially changed, wherein:

an interrupt vector corresponding to such an interrupt request having a top priority order of a default value among the default values of the interrupt request input series is outputted from a final stage of the third circuit group as a signal having a bit number corresponding to a total input number of the interrupt request input series.

Furthermore, the interrupt control apparatus, as recited in the fourth aspect of the present invention, is featured by that the first circuit group is constituted by arranging circuits in the order of the default values of the interrupt request inputs; and each of the circuits includes a first OR gate circuit for OR-gating two interrupt request inputs having default inputs having default values adjacent to each other, and a first AND gate circuit for AND-gating the two interrupt request inputs;

the second circuit group is constituted by a second OR gate circuit for OR-gating the two interrupt requests OR-gated by two sets of the first adjoining OR gate circuits employed in the first circuit group, a second AND gate circuit for AND-gating the two interrupt requests AND-gated by two sets of the first adjoining AND gate circuits, and also a first selector for selecting one of the interrupt requests AND-gated by the two first adjoining AND gate circuits to output an AND-gated interrupt request having a higher priority order in response to the output from the first OR gating circuit;

and such a circuit for outputting signals in a parallel manner, while defining the output from the second AND gate circuit as an upper digit of the signal and the output from the first selector as a lower digit thereof is connected to the output of the first circuit group; and the third circuit group is constituted by a third OR gate circuit for OR-gating the two interrupt requests OR-gated by two sets of the second adjoining OR gate circuits employed in the second circuit group, a third AND gate circuit for AND-gating the two interrupt requests AND-gated by two sets of the second adjoining AND gate circuits, and also a second selector for selecting one of the interrupt requests AND-gated by the two second adjoining AND-gate circuits to output signals containing the AND-gated output of the two second AND gate circuits as an upper digit thereof and the output of the first selector as a lower digit thereof in response to an OR-gated interrupt request having a higher priority order; and such a circuit for outputting signals in a parallel manner, while defining the output from the third AND gate circuit as an upper digit of the signals and the output from the second selector as a lower digit thereof is connected to the output of the first circuit group in a reverse tree-structure.

In the interrupt control apparatus according to the present invention, when the interrupt request is applied, the interrupt factor is held in the interrupt flag holding means in the first stage, and the interrupt level of this interrupt request is judged by the interrupt level judging means and also the interrupt request signal is outputted to the processor in the second stage. In the third stage, the interrupt vector is generated by the interrupt vector. Then, the processor samples the interrupt vector outputted by the interrupt vector output means to thereby commence the interrupt processing operation in the fourth stage. The above-described process operations of the respective stages are carried out by executing the pipeline process operation.

As previously described, in accordance with the present invention, even under such a condition that the processor can hardly accept the interrupt request, the interrupt control apparatus judges the priority orders of the interrupt requests in the pipeline processing manner independent from the processor. These priority orders are sequentially changed. When the processor is brought into such a condition that this processor can accept the interrupt request, the interrupt control apparatus continuously output to the processor, such an interrupt vector corresponding to the interrupt factor having the top priority order. To execute the interrupting process operations in the pipeline processing manner, the respective stages are processed within 1 clock.

BRIEF DESCRIPTION OF THE DRAWINGS

The above and other objects, advantages and features of the present invention will be more apparent from the following description taken in conjunction with the accompanying drawings in which:

FIG. 3 is a state transition diagram for indicating state changes of the respective circuits employed in the interrupt control apparatus of FIG. 1;

FIG. 5 is a diagram for representing a relationship between a default value indicative of a priority order of an interrupt factor and an interrupt level representative of a priority order of an interrupt request;

FIG. 11 is the state transition diagram for indicating state changes of the respective circuits of the conventional interrupt control apparatus.

DESCRIPTION OF THE PREFERRED EMBODIMENTS

Referring to drawings, various preferred embodiments of the present invention will be described in detail.

Arrangement of First Interrupt Control Apparatus

Figure 1:
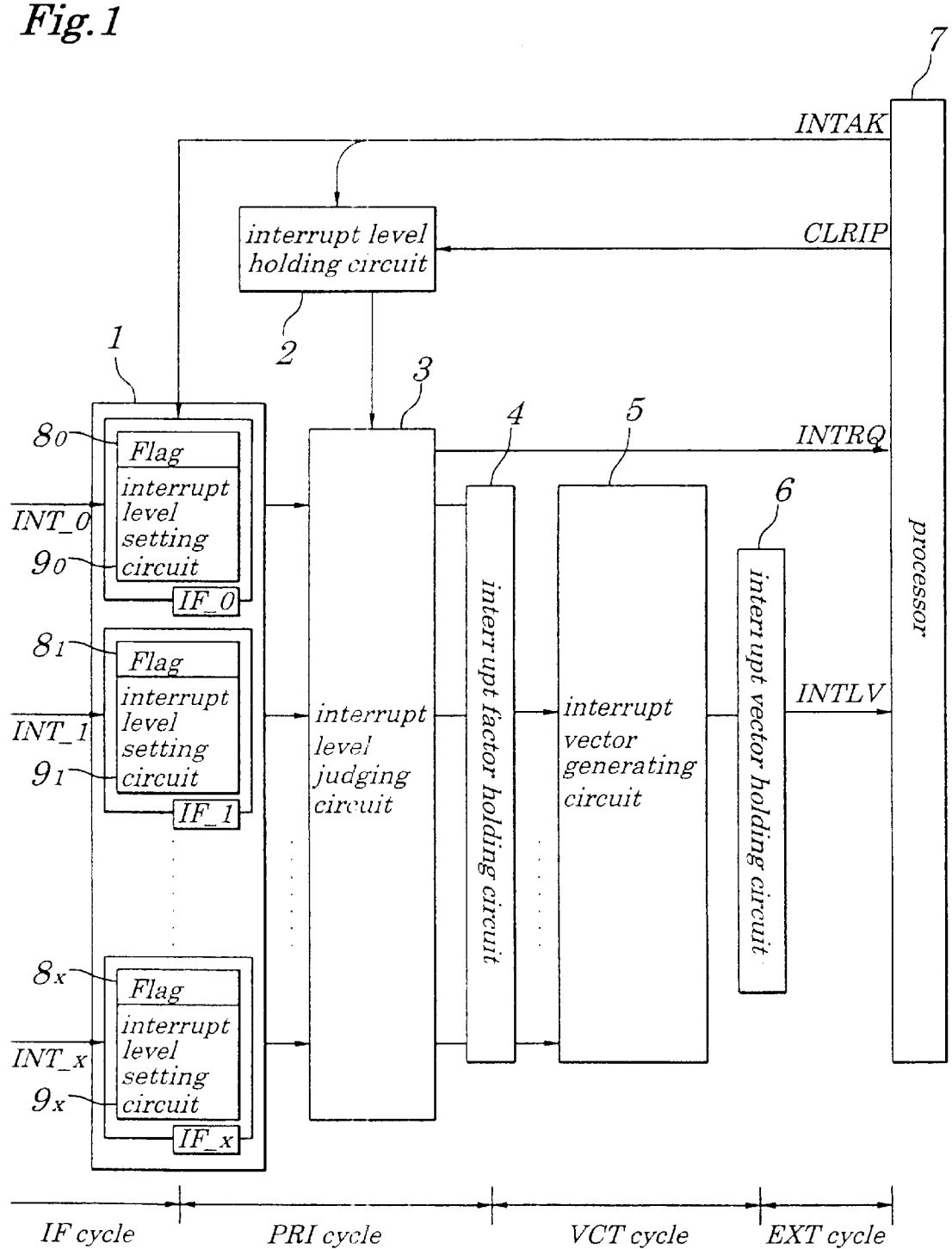
FIG. 1 is a schematic block diagram for indicating an arrangement of an interrupt control apparatus employed in an information processing apparatus according to a first preferred embodiment of the present invention.
Figure 2:
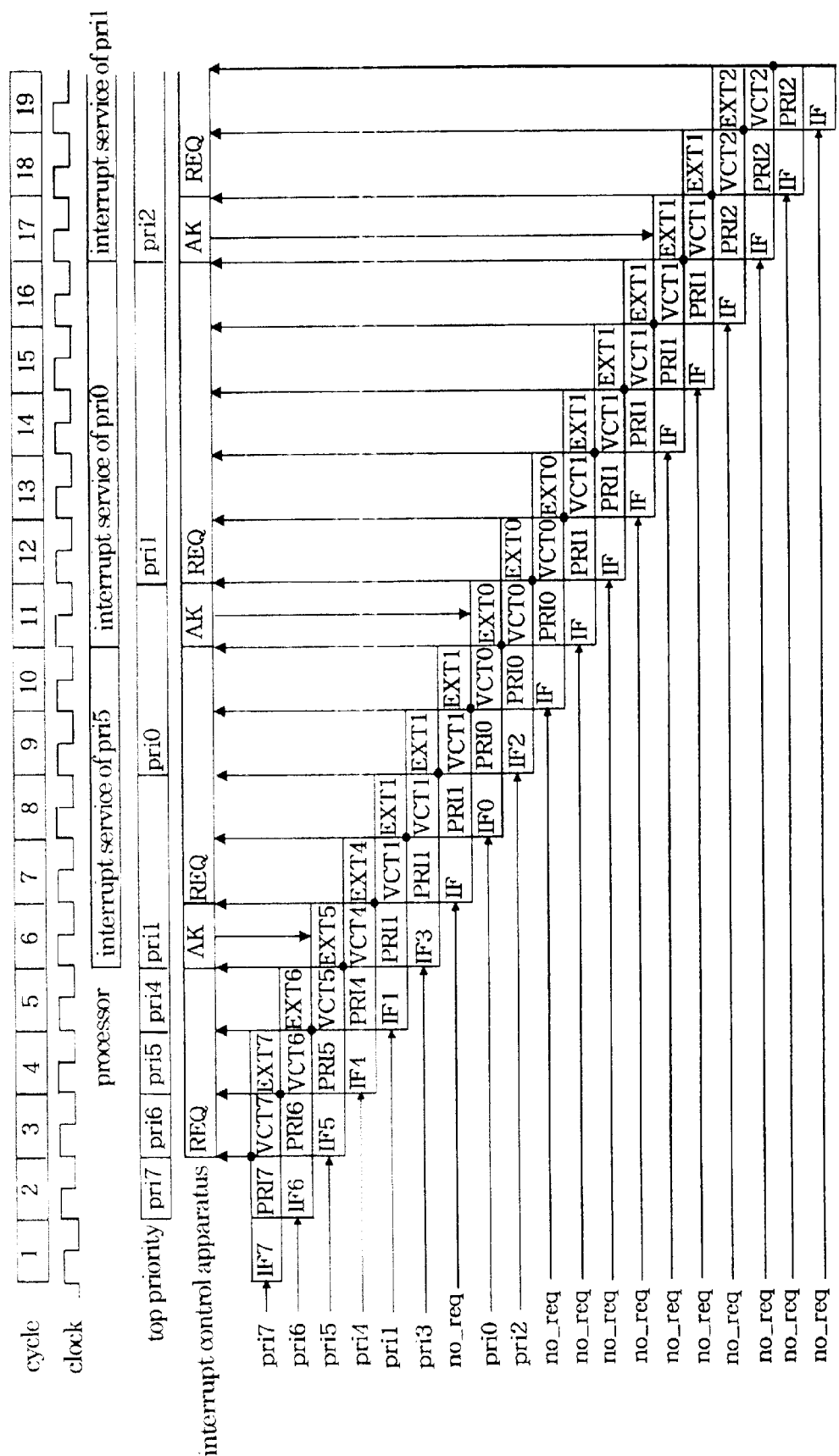
FIG. 2 is a timing chart for explaining control operation of the interrupt control apparatus shown in FIG. 1.

FIG. 1 is a schematic block diagram for indicating an arrangement of an interrupt control apparatus employed in an information processing apparatus, according to a first preferred embodiment of the present invention. FIG. 2 is a timing chart for explaining control operation of the interrupt control apparatus shown in FIG. 1. FIG. 3 is a state transition diagram for indicating state changes of the respective circuits employed in the interrupt control apparatus of FIG. 1.

As indicated in FIG. 1, this first interrupt control apparatus is mainly arranged by an interrupt flag holding circuit 1, an interrupt level holding circuit 2, an interrupt level judging circuit 3, an interrupt factor holding circuit 4, an interrupt vector generating circuit 5, and an interrupt vector holding circuit 6.

When an interrupt request corresponding to any interrupt factor is entered, the interrupt flag holding circuit 1 sets a flag in correspondence with the entered interrupt request, and further holds an interrupt level. The interrupt level holding circuit 2 holds an interrupt level of an interrupt request under execution by a processor 7. The interrupt level judging circuit 3 judges such an interrupt level having a top priority order among the interrupt levels held in the interrupt flag holding circuit 1, and outputs an interrupt factor corresponding thereto to the interrupt factor holding circuit 4. Furthermore, this interrupt level judging circuit 3 outputs an interrupt request signal by this interrupt factor to the processor 7. The interrupt factor holding circuit 4 holds the interrupt factor outputted from the interrupt level judging circuit 3. The interrupt vector generating circuit 5 generates an interrupt vector indicative of an interrupt sort in response to the interrupt factor outputted from the interrupt factor holding circuit 4. The interrupt vector holding circuit 6 holds the generated interrupt vector, and outputs the held interrupt vector to the processor 7.

The above-explained interrupt flag holding circuit 1 contains flag units $8_1, 8_2, ---, 8_x$, and interrupt level setting circuits $9_1, 9_2, ---, 9_x$ in correspondence with interrupt inputs INT-1, INT-2, - - - , INT-X with respect to each of interrupt factors.

The flag units $8_1, 8_2, ---, 8_x$ set flags when an interrupt request is entered to the corresponding input. The interrupt level setting circuits $9_1, 9_2, ---, 9_x$ set interrupt levels corresponding to the interrupt request when the flag is set.

Operations of First Interrupt Control Apparatus

Next, a description will be made of operations of the above-described interrupt control apparatus employed in the information processing apparatus, according to the first embodiment of the present invention with reference to FIG. 1.

It should be understood that interrupt requests are issued in correspondence with the respective interrupt factors specific thereto to the interrupt inputs INT-0, INT-1, - - - , INT-X. When an interrupt request is issued to anyone of these inputs, the interrupt flag holding circuit 1 sets the flag to the corresponding input so as to indicate that the interrupt request of this interrupt factor, and also sets the interrupt level in connection with this interrupt request. An interrupt level is arbitrarily set by, for example, a programmable manner on the input side. The interrupt levels are indicated by, for instance, priority orders "pri0" to "pri7". It is assumed that the smaller the numerals of priority orders become, the higher the priority orders become.

On the other hand, the interrupt level holding circuit 2 holds an interrupt level of an interrupt request which is being processed by the processor 7. For example, the processor 7 may process 8 pieces of interrupt requests. In such a case that an interrupt request is issued, the interrupt level of which is higher than that of another interrupt request process operation under execution is interrupted, and then an interrupt process operation for this interrupt request having the higher interrupt level is carried out. When this interrupt process operation for the higher interrupt level is accomplished, the interrupt level held in the interrupt level holding circuit 2 is cleared, and then the first-mentioned interrupt process operation for the lower interrupt level, which has been interrupted, is restarted.

When a flag is set to the interrupt flag holding circuit 1 upon input of an interrupt request, a set interrupt level is also entered into the interrupt level judging circuit 3. The interrupt level judging circuit 3 judges priority orders as to the interrupt levels held in the interrupt flag holding circuit 1. At this time, the interrupt level judging circuit 3 judges the priority orders as to only such an interrupt level higher than the interrupt level held in the interrupt level holding circuit 2, and then holds the interrupt request having the top priority order into the interrupt factor holding circuit 4.

The interrupt vector generating circuit 5 generates an interrupt vector indicative of an interrupt sort in response to an interrupt factor of an interrupt request held in the interrupt factor holding circuit 4, and then holds the generated interrupt vector to the interrupt vector holding circuit 6. Next, the interrupt vector held in the interrupt vector holding circuit 6 is outputted.

Before the above-described interrupt vector is outputted, when the interrupt level judging circuit 3 judges the priority orders, an interrupt request signal INTRQ is issued to the processor 7. When the processor 7 can accept an interrupt request, this processor 7 returns an interrupt acknowledge signal INTAK to the interrupt flag holding circuit 1, and commences an interrupt process routine by receiving an interrupt vector from the interrupt vector holding circuit 6. At this time, the corresponding flag held in the interrupt level holding circuit 1 is cleared in response to the interrupt acknowledge signal INTAK, and further the interrupt level executed by the processor 7 is held in the interrupt level holding circuit 2. When the processor 7 accomplishes the process operation, a clear signal CLRIP is outputted so as to clear the corresponding interrupt level held in the interrupt level holding circuit 2.

State Transitions in First Interrupt Control Apparatus

The state transitions of the respective circuits when the interrupt control operation is carried out in the first interrupt control apparatus of FIG. 1 will be explained with reference to FIG. 2 and FIG. 3. Since the interrupt process operations by this interrupt process control apparatus are sequentially executed every 1 clock cycle by way of a pipeline processing manner, state changes of the respective circuits are explained every 1 clock cycle. In the drawings, an IF stage (interrupt flag holding stage) indicates an operation cycle of the interrupt flag holding circuit 1; a PRI stage (interrupt level judging stage) shows an operation cycle of the interrupt level judging circuit 3; a VCT stage (interrupt vector generating stage) represents an operation cycle of the interrupt vector generating circuit 5; and an EXT cycle (interrupt vector output stage) denotes an operation cycle of the interrupt vector holding circuit 6. It should be understood that in FIG. 2 and FIG. 3, priority orders (degrees) of interrupt priority orders "pri0" to "pri7", processing cycle numbers, and interrupt request inputs are set to be equal to those of FIG. 10 and FIG. 11, for the sake of easy comparisons with the conventional interrupt control operations shown in FIG. 10 and FIG. 11.

The interrupt processing operations of the first information processing apparatus are executed in accordance with the following cycles:

(1) 1st Cycle

Assuming now that an interrupt request having a priority order "pri7" is issued in any one of interrupt request inputs INT-0 to INT-x under such a condition that all of the contents of the interrupt flag holding circuit 1 and of the interrupt level holding circuit 2 are cleared, a flag is set to the interrupt flag holding circuit 1 in the IF stage (this state is indicated as "IF7").

(2) 2nd Cycle

Next, in the PRI stage, the interrupt level held in the interrupt flag holding circuit 1 is read, and the read interrupt level is judged by the interrupt level judging circuit 3. Since the priority order pri7 is the highest order, the interrupt factor of pri7 is held in the interrupt factor holding circuit 4, and also an interrupt request "REQ" based upon pri7 is outputted to the processor 7 from the interrupt level judging circuit 3 via an interrupt request signal line INTRQ (this state is indicated as "PRI7"). At this time, since an interrupt request having a priority order "pri6" is issued, a flag is set to the interrupt flag holding circuit 1 in the IF stage (this state is indicated as "IF6").

(3) 3rd Cycle

While the interrupt request REQ based on pri7 is issued from the interrupt level judging circuit 3 to the processor 7, this processor 7 is set to such a state for rejecting the interrupt request REQ based on pri7. On the other hand, at a VCT stage, the interrupt vector generating circuit 5 generates an interrupt vector by the interrupt factor of pri7 read from the interrupt factor holding circuit 4, and the generated interrupt vector of pri7 is held in the interrupt vector holding circuit 6 (this state is indicated as "VCT7"). Also, the interrupt level held in the interrupt flag holding circuit 1 is read, and then the interrupt level judgement is carried out by the interrupt level judging circuit 3. Since the priority order of pri6 is a top priority order, the interrupt factor of pri6 is held in the interrupt factor holding circuit 4, and also an interrupt request REQ based upon pri6 is outputted from the interrupt level judging circuit 3 to the processor 7 (this state is indicated as "PRI6") Also, in the IF stage, since an interrupt request having a priority order of "pri5" is issued, a flag is set to the interrupt flag holding circuit 1 (this state is indicated as "IF5").

(4) 4th Cycle

While, although the interrupt request REQ based on pri6 is issued from the interrupt level judging circuit 3 to the processor 7, this processor 7 is set to such a state for rejecting the interrupt request REQ based on pri6. On the other, at an EXT stage, the interrupt vector based upon pri7 held in the interrupt vector holding circuit 6 is outputted (this state is indicated as "EXT7") On the other hand, at a VCT stage, the interrupt vector generating circuit 5 generates an interrupt vector by the interrupt factor of pri6 read from the interrupt factor holding circuit 4, and the generated interrupt vector of pri6 is held in the interrupt vector holding circuit 6 (this state is indicated as "VCT6"). Further, the interrupt level held in the interrupt flag holding circuit 1 is read, and then the interrupt level judgement is carried out by the interrupt level judging circuit 3. Since the priority order of pri5 is a top priority order, the interrupt factor of pri5 is held in the interrupt factor holding circuit 4, and also an interrupt request REQ based upon pri5 is outputted from the interrupt level judging circuit 3 to the processor 7 (this state is indicated as "PRI5"). Also, in the IF stage, since an interrupt request having a priority order of "pri4" is issued, a flag is set to the interrupt flag holding circuit 1 (this state is indicated as "IF4").

(5) 5th Cycle

As to an interrupt request REQ based upon pri5 outputted from the interrupt level judging circuit 3, the processor 7 can accept this interrupt request REQ. On the other hand, at an EXT stage, an interrupt vector based upon pri6 held in the interrupt vector holding circuit 6 is outputted (this condition is indicated as "EXT6"). Also, at a VCT stage, the interrupt vector generating circuit 5 generates an interrupt vector by the interrupt factor of pri5 read from the interrupt factor holding circuit 4, and the generated interrupt vector of pri5 is held in the interrupt vector holding circuit 6 (this state is indicated as "VCT5"). Further, the interrupt level held in the interrupt flag holding circuit 1 is read, and then the interrupt level judgement is carried out by the interrupt level judging circuit 3. Since the priority order of pri4 is a top priority order, the interrupt factor of pri4 is held in the interrupt factor holding circuit 4, and also an interrupt request REQ based upon pri4 is outputted from the interrupt level judging circuit 3 to the processor 7 (this state is indicated as "PRI4"). Also, in the IF stage, since an interrupt request having a priority order of "pri1" is issued, a flag is set to the interrupt flag holding circuit 1 (this state is indicated as "IF1").

(6) 6th Cycle

At an EXT stage, an interrupt vector based on pri5 held in the interrupt vector holding circuit 6 is outputted (this state is indicated as "EXT5"). The processor 7 samples the interrupt vector based on pri5 to branch the sampled interrupt vector to a target. The processor 7 commences an interrupt service of pri5 by performing an interrupt process operation in an interrupt process routine, and further returns an interrupt acknowledge AK to the interrupt flag holding circuit 1 via the interrupt acknowledge signal line INTAK. As a result, the interrupt flag based on pri5 held in the interrupt flag holding circuit 1 is cleared, and also the interrupt level having the priority order of pri5 held in the interrupt level holding circuit 2 is cleared. On the other hand, at a VCT stage, the interrupt vector generating circuit 5 generates an interrupt vector by the interrupt factor of pri4 read from the interrupt factor holding circuit 4, and the generated interrupt vector of pri4 is held in the interrupt vector holding circuit 6 (this state is indicated as "VCT4"). Furthermore, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1"). Also, in the IF stage, since an interrupt request having a priority order of "pri3" is issued, a flag is set to the interrupt flag holding circuit 1 (this state is indicated as "IF3").

(7) 7th Cycle

The processor 7 executes an interrupt service of pri5. On the other hand, at an EXT stage, the interrupt vector based on pri4 held in the interrupt vector holding circuit 6 is outputted (this state is indicated as EXT4). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1"). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1"). Also, in the IF stage, since an interrupt request is not issued, the state of the interrupt flag holding circuit 1 is not changed (this state is indicated as "IF").

(8) 8th Cycle

The processor 7 continues an interrupt service based upon pri5. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1 "). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI0"). Also, in the IF stage, since an interrupt request having a priority order of "pri0" is issued, a flag is set to the interrupt flag holding circuit 1 (this state is indicated as "IF0").

(9) 9th Cycle

The processor 7 continues the interrupt service based upon pri5. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1") Furthermore, the interrupt level held in the interrupt flag holding circuit 1 is read, and then the interrupt level judgement is carried out by the interrupt level judging circuit 3. Since the priority order of pri0 is a top priority order, the interrupt factor of pri0 is held in the interrupt factor holding circuit 4, and also an interrupt request REQ based upon pri0 is outputted from the interrupt level judging circuit 3 to the processor 7 (this state is indicated as "PRI0"). Also, in the IF stage, since an interrupt request having a priority order of "pri2" is issued, a flag is set to the interrupt flag holding circuit 1 (this state is indicated as "IF2").

(10) 10th Cycle

As to the interrupt request REQ based upon pri0 outputted from the interrupt level judging circuit 3 to the processor 7, the processor 7 is brought into the acceptance condition. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri0 read from the interrupt factor holding circuit 4, and the generated interrupt vector of pri0 is held in the interrupt vector holding circuit 6 (this state is indicated as "VCT0"). Further, the interrupt level held in the interrupt flag holding circuit 1 is read, and then the interrupt level judgement is carried out by the interrupt level judging circuit 3. Since the priority order of pri0 is a top priority order, the interrupt factor of pri0 is held in the interrupt factor holding circuit 4, and also an interrupt request REQ based upon pri6 is outputted from the interrupt level judging circuit 3 to the processor 7 (this state is indicated as "PRI0"). At this stage, since no interrupt request is issued, the condition of the interrupt flag holding circuit 1 is not changed (this state is indicated as "IF").

(11) 11th Cycle

At an EXT stage, the interrupt vector of pri0 held in the interrupt vector holding circuit 6 is outputted (this state is indicated as "EXT0"). The processor 7 samples the interrupt vector based on pri0 to branch into a target so as to execute an interrupt process routine. The processor 7 commence an interrupt service of pri0. The processor 7 returns an interrupt acknowledge AK to the interrupt flag holding circuit 1 via the interrupt acknowledge signal line INTAK. As a result, the interrupt flag based on pri0 held in the interrupt flag holding circuit 1 is cleared, and also the interrupt level having the priority order of pri0 held in the interrupt level holding circuit 2 is cleared. On the other hand, at a VCT stage, the interrupt vector generating circuit 5 generates an interrupt vector by the interrupt factor of pri0 read from the interrupt factor holding circuit 4, and the generated interrupt vector of pri0 is held in the interrupt vector holding circuit 6 (this state is indicated as "VCT0"). Moreover, the interrupt level held in the interrupt flag holding circuit 1 is read, and then the interrupt level judgement is carried out by the interrupt level judging circuit 3. Since the priority order of pri0 is a top priority order, the interrupt factor of pri0 is held in the interrupt factor holding circuit 4, and also an interrupt request REQ based upon pri0 is outputted from the interrupt level judging circuit 3 to the processor 7 (this state is indicated as "PRI0"). Subsequently, since no interrupt request is issued until a 16th cycle, the condition of the interrupt flag holding circuit 1 is not changed at the IF stage (this condition is indicated as "IF").

(12) 12th Cycle

The processor 7 continues the interrupt service based upon pri0. On the other hand, at an EXT stage, the interrupt vector of pri0 held in the interrupt vector holding circuit 6 is outputted (this state is indicated as "EXT0"). Also, at a VCT stage, the interrupt vector generating circuit 5 generates an interrupt vector by the interrupt factor of pri0 read from the interrupt factor holding circuit 4, and the generated interrupt vector of pri0 is held in the interrupt vector holding circuit 6 (this state is indicated as "VCT0"). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1").

(13) 13th Cycle

The processor 7 continues the interrupt service based upon pri0. On the other hand, at an EXT stage, the interrupt vector of pri0 held in the interrupt vector holding circuit 6 is outputted (this state is indicated as "EXT0"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1").

Furthermore, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1").

(14) 14th Cycle

The processor 7 continues the interrupt service based upon pri0. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1"). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1").

(15) 15th Cycle

The processor 7 continues the interrupt service based upon pri0. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1"). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri1 is outputted from the interrupt level judging circuit 3 to the processor 7 (this state is indicated as "PRI1").

(16) 16th Cycle

As to an interrupt request REQ based upon pri1 outputted from the interrupt level judging circuit 3 to the processor 7, the processor 7 is brought into such a condition that this processor 7 can accept this interrupt request REQ. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1"). Further, the interrupt level held in the interrupt flag holding circuit 1 is read, and then the interrupt level judgement is carried out by the interrupt level judging circuit 3. Since the priority order of pri1 is a top priority order, the interrupt factor of pri1 is held in the interrupt factor holding circuit 4, and also an interrupt request REQ based upon pri6 is outputted from the interrupt level judging circuit 3 to the processor 7 (this state is indicated as "PRI1").

(17) 17th Cycle

At an EXT stage, the interrupt vector of pri1 held in the interrupt vector holding circuit 6 is outputted (this state is indicated as "EXT1"). The processor 7 samples the interrupt vector of pri1 to be branched to a target, and then executes an interrupt process routine, so that this processor 7 commences an interrupt service of pri1, and further returns an interrupt acknowledge AK to the interrupt flag holding circuit 1 via the interrupt acknowledge signal line INTAK. As a result, the interrupt flag based on pri1 held in the interrupt flag holding circuit 1 is cleared, and also the interrupt level having the priority order of pri1 held in the interrupt level holding circuit 2 is cleared. On the other hand, at a VCT stage, the interrupt vector generating circuit 5 generates an interrupt vector by the interrupt factor of pri1 read from the interrupt factor holding circuit 4, and the generated interrupt vector of pri1 is held in the interrupt vector holding circuit 6 (this state is indicated as "VCT1"). Further, the interrupt level held in the interrupt flag holding circuit 1 is read, and then the interrupt level judgement is carried out by the interrupt level judging circuit 3. Since the priority order of pri2 is a top priority order, the interrupt factor of pri2 is held in the interrupt factor holding circuit 4, and also an interrupt request REQ based upon pri2 is outputted from the interrupt level judging circuit 3 to the processor 7 (this state is indicated as "PRI2"). Subsequently, since no interrupt request is issued until a 19th cycle, the condition of the interrupt flag holding circuit 1 is not changed (this condition is indicated as "IF").

(18) 18th Cycle

The processor 7 performs the interrupt service based upon pri1. On the other hand, at an EXT stage, the interrupt vector of pri1 held in the interrupt vector holding circuit 6 is outputted (this state is indicated as "EXT1"). Also, at a VCT stage, the interrupt vector generating circuit 5 generates an interrupt vector by the interrupt factor of pri2 read from the interrupt factor holding circuit 4, and the generated interrupt vector of pri2 is held in the interrupt vector holding circuit 6 (this state is indicated as "VCT2"). Further, the interrupt level held in the interrupt flag holding circuit 1 is read, and then the interrupt level judgement is carried out by the interrupt level judging circuit 3. Since the priority order of pri2 is a top priority order, the interrupt factor of pri2 is held in the interrupt factor holding circuit 4, and also an interrupt request REQ based upon pri2 is outputted from the interrupt level judging circuit 3 to the processor 7 (this state is indicated as "PRI2").

(19) 19th Cycle

The processor 7 continues the interrupt service based upon pri1. On the other hand, at an EXT stage, the interrupt vector of pri2 held in the interrupt vector holding circuit 6 is outputted (this state is indicated as "EXT2"). Also, at a VCT stage, the interrupt vector generating circuit 5 generates an interrupt vector by the interrupt factor of pri2 read from the interrupt factor holding circuit 4, and the generated interrupt vector of pri2 is held in the interrupt vector holding circuit 6 (this state is indicated as "VCT2"). Moreover, the interrupt level held in the interrupt flag holding circuit 1 is read, and then the interrupt level judgement is carried out by the interrupt level judging circuit 3. Since the priority order of pri2 is a top priority order, the interrupt factor of pri2 is held in the interrupt factor holding circuit 4, and also an interrupt request REQ based upon pri2 is outputted from the interrupt level judging circuit 3 to the processor 7 (this state is indicated as "PRI2").

Figure 10:
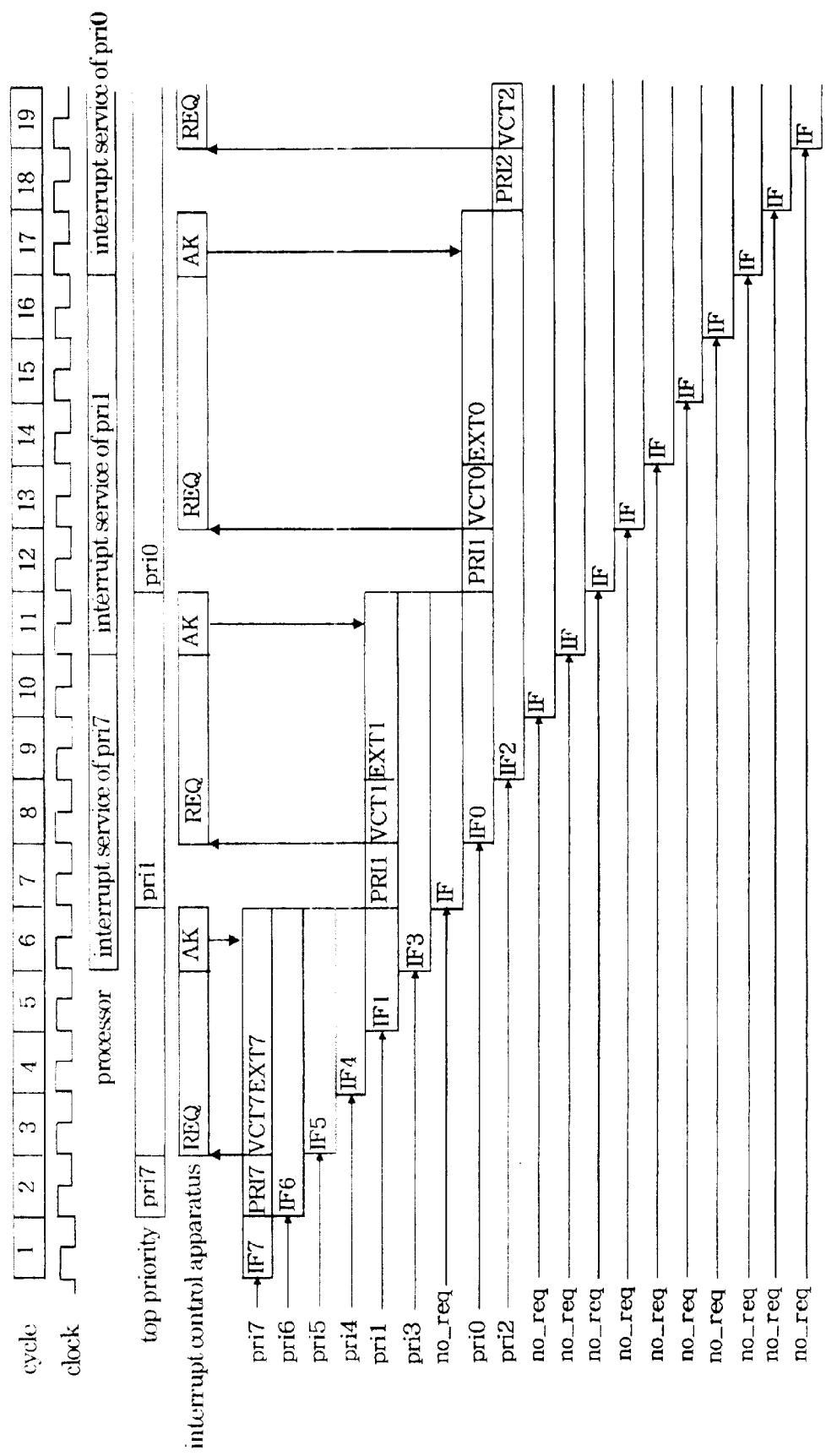
FIG. 10 is a timing chart for explaining the control operation of the interrupt control apparatus employed in the conventional information processing apparatus.

As previously described, in accordance with this first embodiment, the process operation of the IF stage, the process operation of the PRI stage, the process operation of the VCT stage, and also the process operation of the EXT stage are carried out in the pipeline processing manner. At the EXT stage, the interrupt factor is outputted to the processor in response to the interrupt request whose interrupt level is judged as the top priority order at the PRI stage. As a consequence, the interrupt response characteristic with respect to the interrupt request having the high priority order can be improved. Assuming now that the interrupt requests are issued in the order of pri7, pri6, pri5, pri4, pri1, pri3, and pri0, the interrupt services by the processor 17 in the conventional information processing apparatus shown in FIG. 10 and FIG. 11 are carried out in the order of pri7, pri1, and pri0. In contrast, the interrupt services by the processor 7 in the first information processing apparatus shown in FIG. 2 and FIG. 3 are carried out in the order of pri5, pri0, and pri1. As apparent from the above-described comparison, the interrupt response characteristic with respect to the interrupt request having the high priority order can be increased.

Arrangement of Second Interrupt Control Apparatus

Since the interrupt levels are arbitrarily given to the interrupt factors, there are possibilities that a plurality of interrupt requests may be issued, the priority orders of which are judged as the top priority orders in the interrupt level judging circuit 3. This possibility may cause that a plurality of interrupt vectors may compete with each other. However, this compete problem can be solved by such a manner that the priority orders are judged based upon default values indicative of array orders of interrupt request inputs. This solution may be accomplished by an interrupt control apparatus according to a second embodiment of the present invention.

Figure 4:
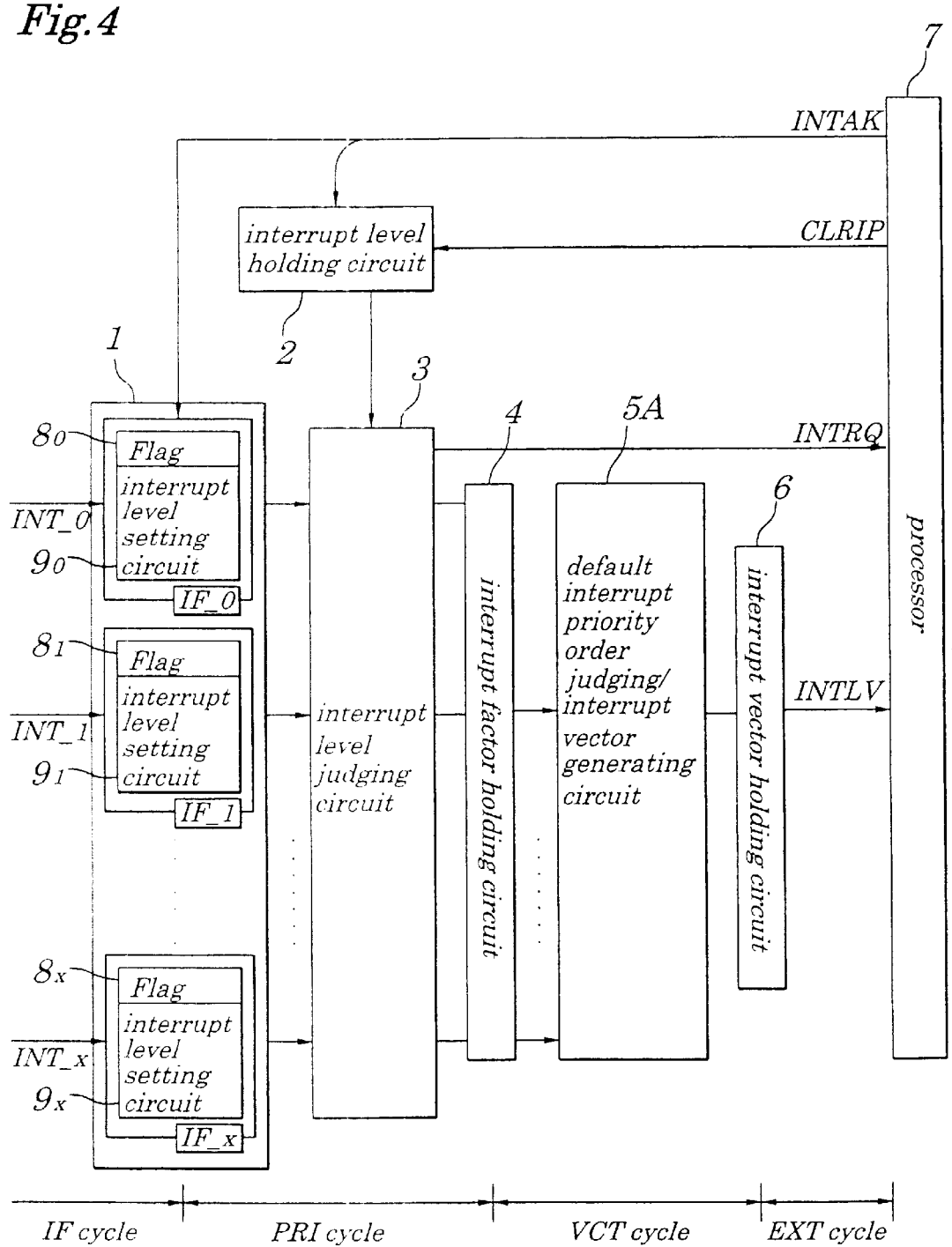
FIG. 4 is a schematic block diagram for showing an arrangement of an interrupt control apparatus employed in an information processing apparatus according to a second preferred embodiment of the present invention.
Figure 6:
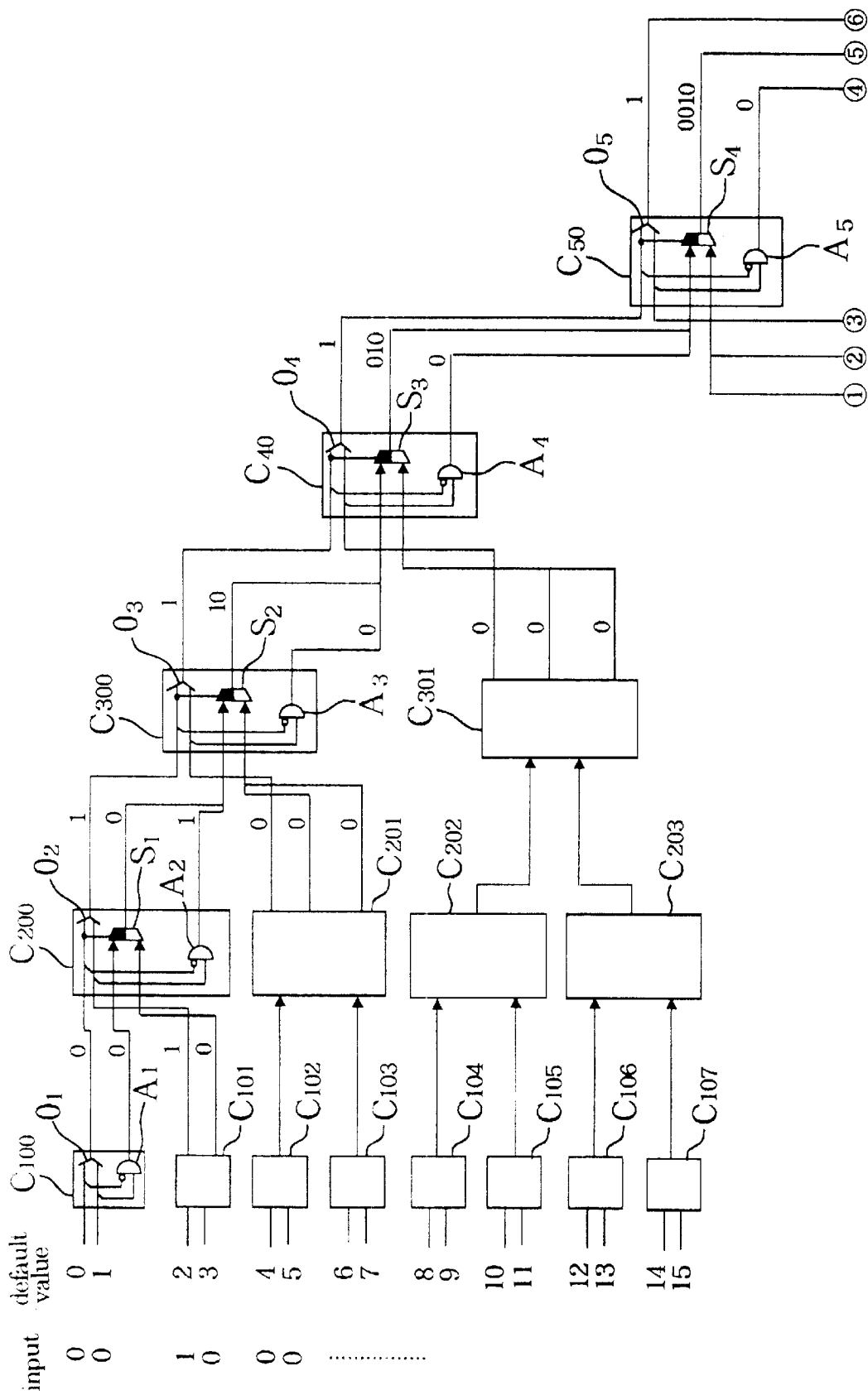
FIG. 6 is a diagram (1) for showing a structural example of a default interrupt priority order judging/interrupt vector generating circuit employed in the interrupt control apparatus of FIG. 4.
Figure 7:
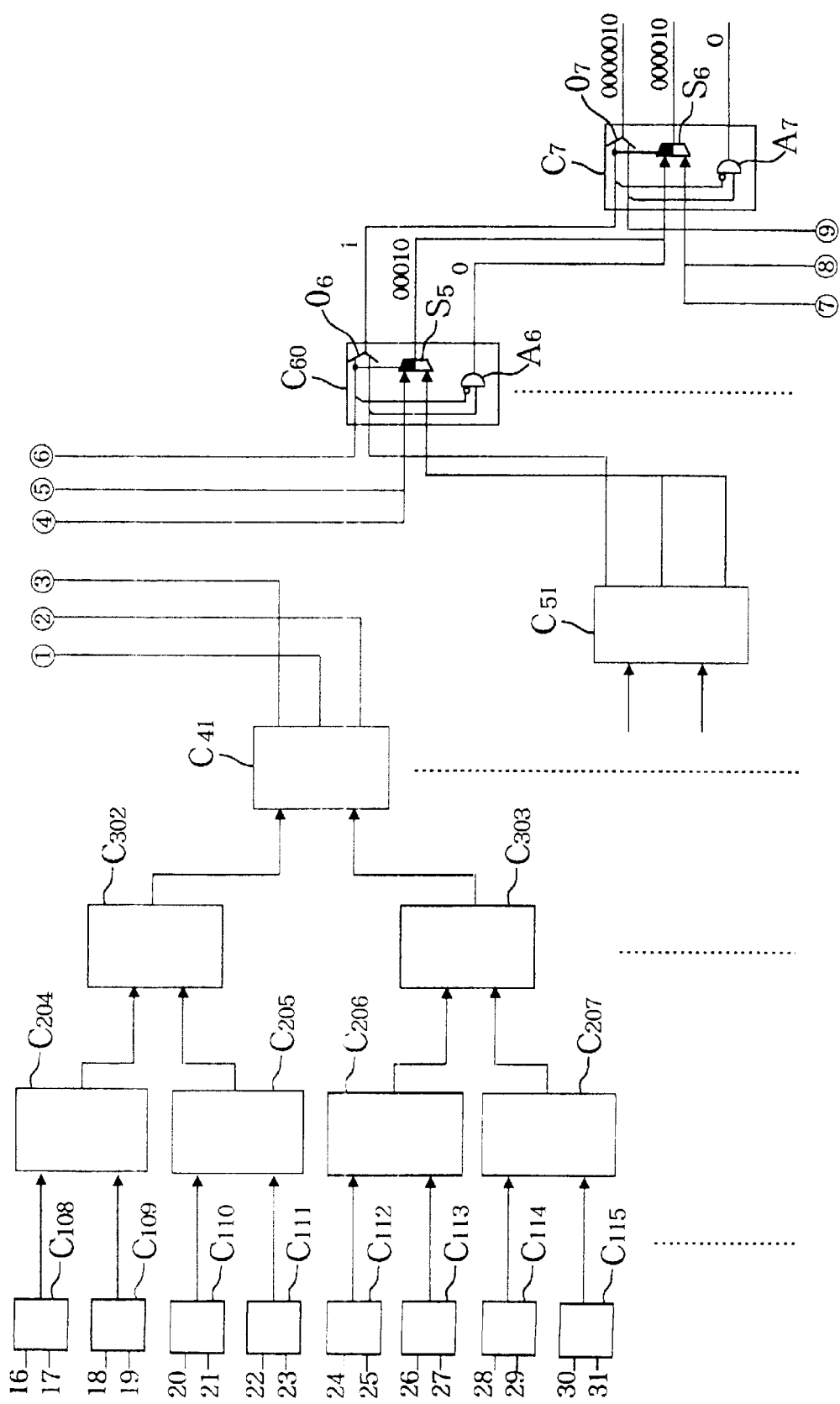
FIG. 7 is a diagram (2) for showing a structural example of a default interrupt priority order judging/interrupt vector generating circuit employed in the interrupt control apparatus of FIG. 4.
Figure 8:
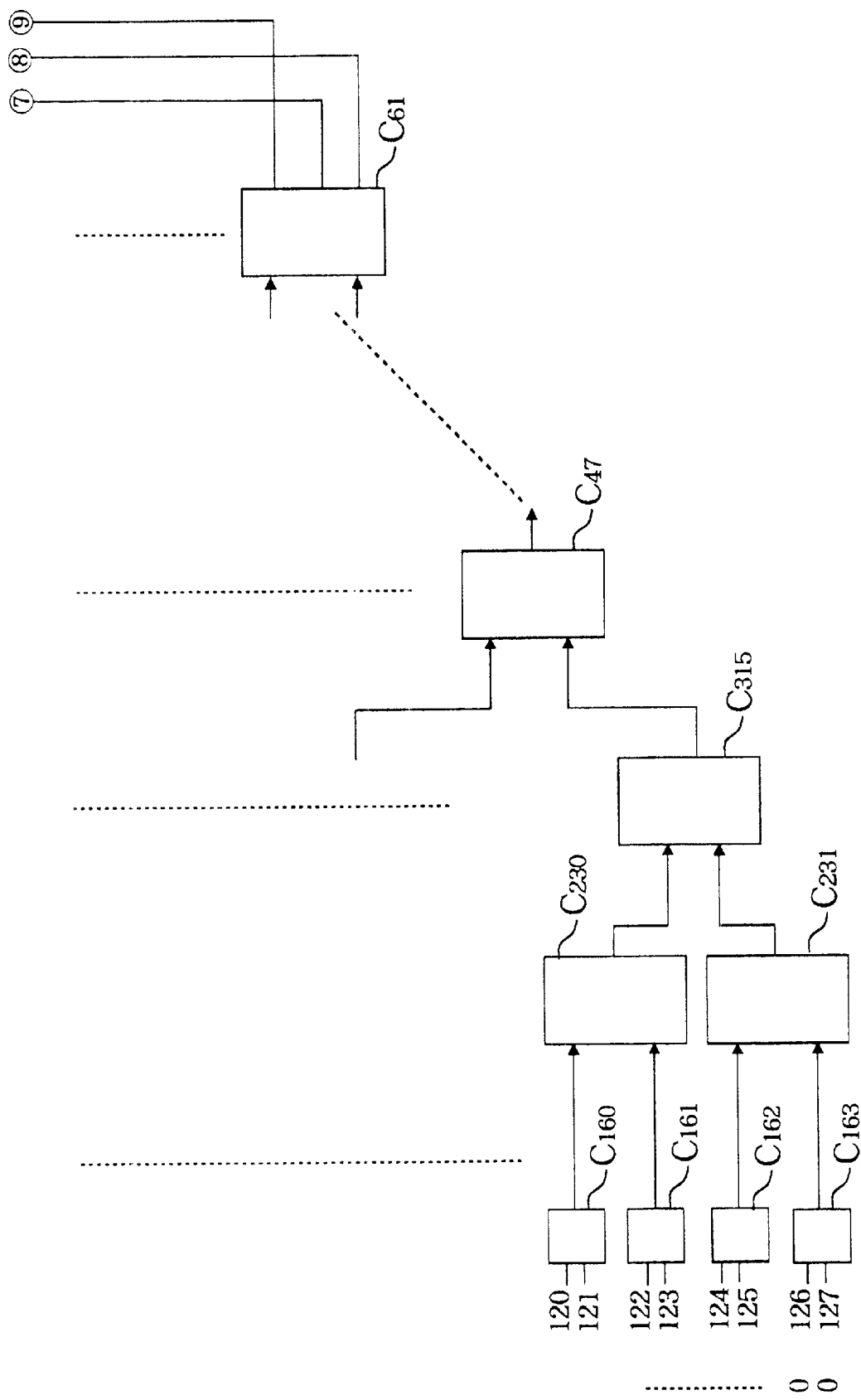
FIG. 8 is a diagram (3) for showing a structural example of a default interrupt priority order judging/interrupt vector generating circuit employed in the interrupt control apparatus of FIG. 4.
Figure 9:
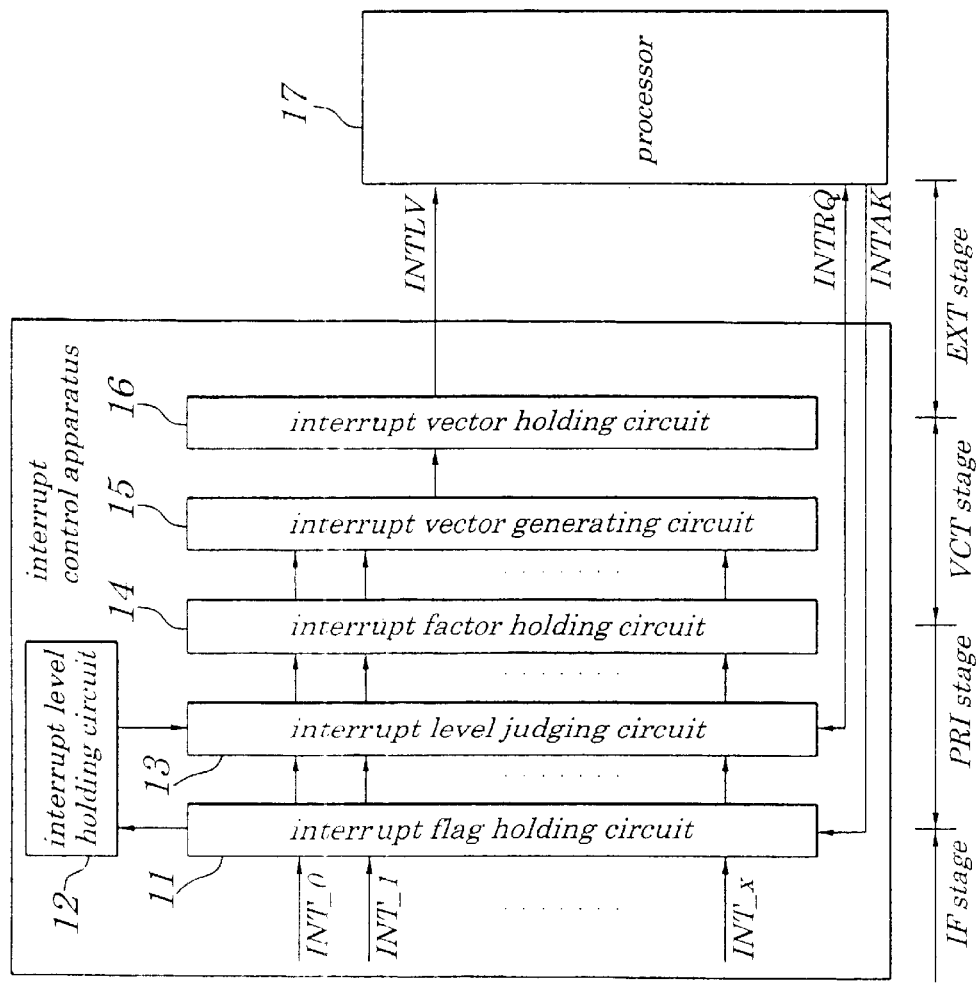
FIG. 9 is a schematic block diagram for indicating the arrangement of the conventional interrupt control apparatus.

FIG. 4 is a schematic block diagram for showing an arrangement of an interrupt control apparatus employed in an information processing apparatus, according to the second preferred embodiment of the present invention. FIG. 5 is a diagram for representing a relationship between a default value indicative of a priority order of an interrupt factor and an interrupt level representative of a priority order of an interrupt request. FIG. 6 is a diagram (1) for showing a structural example of a default interrupt priority order judging/interrupt vector generating circuit employed in the interrupt control apparatus of FIG. 4. FIG. 7 is a diagram (2) for showing a structural example of a default interrupt priority order judging/interrupt vector generating circuit employed in the interrupt control apparatus of FIG. 4. FIG. 8 is a diagram (3) for showing a structural example of a default interrupt priority order judging/interrupt vector generating circuit employed in the interrupt control apparatus of FIG. 4. As indicated in FIG. 4, this second interrupt control apparatus is mainly arranged by an interrupt flag holding circuit 1, an interrupt level holding circuit 2, an interrupt level judging circuit 3, an interrupt factor holding circuit 4, a default interrupt priority order judging/interrupt vector generating circuit 5A, and also an interrupt vector holding circuit 6.

It should be understood that the above-explained interrupt flag holding circuit 1, interrupt level holding circuit 2, interrupt level judging circuit 3, interrupt factor holding circuit 4, and also the interrupt vector holding circuit 6 are similar to those of the first interrupt control apparatus shown in FIG. 1. The default interrupt priority order judging/interrupt vector generating circuit 5A further performs a priority order judging operation based upon a default value with respect to an interrupt factor outputted from the interrupt factor holding circuit 4 to select an interrupt factor, and then generates an interrupt factor indicative of an interrupt sort in response to the selected interrupt factor.

In FIG. 5, there is shown a relationship between de fault values and interrupt levels in the case that a total number of interrupt request inputs is 16. For instance, as indicated in FIG. 5, default values "0" to "15" are given to interrupt request inputs INT-0, INT-1, INT-2, - - - , INT-15. It is assumed that the smaller the default value becomes, the higher the priority order becomes. Also, it is assumed that priority orders of interrupt levels own "epri0" to "pri7", as indicated in FIG. 5. Similarly, the smaller the interrupt level becomes, the higher the priority order becomes. Generally speaking, such a relationship may be applied to an arbitrarily selected number of interrupt request inputs. Also, in this case, priority order of interrupt levels may be arbitrarily applied, for instance, may be varied in a programmable manner.

Assuming now that an interrupt request is issued to, for example, the interrupt request input INT-2, this interrupt request is defined by that a default value thereof is equal to 2, and this interrupt request owns a priority order of "pri5" as an interrupt level.

Operations of Second Interrupt Control Apparatus

Next, a description will be made of operations of the above-described interrupt control apparatus employed in the information processing apparatus, according to the second embodiment of the present invention with reference to FIG. 1.

It should be understood that interrupt requests are issued in correspondence with the respective interrupt factors specific thereto to the interrupt request inputs INT-0, INT-1, - - - , INT-X. In this second embodiment, operations of the interrupt flag holding circuit 1, the interrupt level holding circuit 2, the interrupt level judging circuit 3, and also the interrupt factor holding circuit 4 in an IF cycle and a PRI cycle are carried out in a similar manner to that of the first embodiment shown in FIG. 1 to FIG. 3.

In the default interrupt priority order judging/interrupt vector generating circuit 5A, the priority order judging operation based upon the default value is carried out in a VCT cycle with respect to the interrupt factors of the interrupt requests held in the interrupt factor holding circuit 4. Then, this default interrupt priority order judging/interrupt vector generating circuit 5A generates the interrupt vector indicative of the interrupt sort with respect to such an interrupt factor having a top priority order. This generated interrupt vector is held in the interrupt vector holding circuit 6. Next, in an EXT cycle, the interrupt vector held in the interrupt vector holding circuit 6 is outputted.

Internal Circuit Arrangement of Default Interrupt Priority Order Judging/Interrupt Vector Generating Circuit The default interrupt priority order judging/interrupt vector generating circuit 5A employed in the information processing apparatus of the second embodiment owns an internal circuit arrangement are shown in FIG. 6 to FIG. 8. That is, this circuit 5A is arranged by 64 sets of circuits $C_{100}$ to $C_{163}$, each of which is made of an OR gate circuit $0_1$ and an AND gate circuit $A_1$; 32 sets of circuits $C_{200}$ to $C_{231}$, each of which is made of an OR gate circuit $0_2$, a selector $S_2$, and an AND gate circuit $A_3$; and also 16 sets of circuits $C_{300}$ to $C_{315}$, each of which is made of an OR gate circuit $O_3$, a selector $S_2$, and an AND gate circuit $A_3$ with respect to 128 sets of interrupt request inputs to which, for instance, default values 0, 1, 2, - - - , 127 are applied. Furthermore, this default interrupt priority order judging/interrupt vector generating circuit 5A is arranged by 8 sets of circuits $C_{40}$ to $C_{47}$, each of which is constituted by an OR gate circuit $O_4$, a selector $S_3$, and an AND gate circuit $A_4$; 4 sets of circuits $C_{50}$ to $C_{53}$ (not shown in detail), each of which is constituted by an OR gate circuit $O_5$, a selector $S_4$, and an AND gate circuit $A_5$; 2 sets of circuit $C_{60}$ to $C_{61}$, each of which is constituted by an OR gate circuit $O_6$, a selector $S_5$, and an AND gate circuit $A_6$; and further one circuit $C_7$ constructed of an OR gate circuit $0_7$, a selector $S_6$, and an AND gate circuit $A_7$. In other words this default interrupt priority order judging/interrupt vector generating circuit 5A is arranged by a 7-staged reverse tree structure. The respective stages are connected via buses to each other. In these drawings, the selectors $S_1$ to $S_6$ employed in these stages are operated in such an assumption manner that when a control input (namely, input signal to upper side of OR gate circuit) becomes "1", each of these selectors $S_1$ to $S_6$ selects an upper-sided contact (marked in black), whereas when a control input becomes "0", each of these selectors $S_1$ to $S_6$ selects a lower-sided contact (marked in white).

In these default interrupt priority order judging/interrupt vector generating circuit 5A, in response to a 1-bit interrupt request input, the 1 st-staged circuits $C_{100}$ to $C_{163}$ produce a 1-bit output from each of the OR gate circuit $O_1$ to $C_{63}$; and 2nd-stage circuit $C_{200}$ to $C_{231}$ produce a 1-bit output of each of the selectors $S_1$ to $S_{31}$ as a lower digit of a 2-bit output, and a 1-bit output of each of the AND gate circuits $A_2$ to $A_{32}$ as an upper digit of this 2-bit output; and further the 3rd-staged circuits $C_{300}$ to $C_{315}$ produce a 2-bit output of each of the selectors $S_2$ to $S_{15}$ as a lower digit of a 3-bit output, and a 1-bit output of each of the AND gate circuits $A_3$ to $A_{18}$ as an upper digit of the 3-bit output. Similar to the above-described manner, the default interrupt priority order judging/interrupt vector generating circuit 5A finally outputs a 7-bit output as an interrupt vector from the 7th-staged circuit $C_7$ by incrementing the bits of the respective stages by 1 bit. This 7-bit output corresponds to 128 interrupt requests.

For example, assuming now that the interrupt request input of the default value 2 is equal to "1" and other interrupt request inputs are equal to "0", the OR gate circuit of the circuit $C_{100}$ outputs "0"; and further the AND gate circuit thereof outputs "0"; the OR gate circuit of the circuit $C_{101}$ outputs "1", the AND gate circuit thereof outputs "0". At the next stage, the OR gate circuit of the circuit $C_{200}$ outputs "1", the AND gate circuit thereof outputs "1", and the lower-sided contact of the selector is selected to output "0". As a result, the output of "1" derived from the AND gate circuit is combined with the upper digit of the selector output of "0" from the circuit $C_{200}$, so that a 2-bit output "10" is produced. Furthermore, at the next stage, the OR gate circuit of the circuit $C_{300}$ outputs "1", the AND gate circuit thereof outputs "0", and the upper-sided contact of the selector thereof is selected to output "10", so that a 3-bit output "010" is produced. Similarly, since the final-staged circuit $C_7$ outputs "0000010", this 7-bit output signal is supplied to a processor (not shown) as the interrupt vector corresponding to the interrupt request of the number 3.

In this case, in such a case that an interrupt request having a default value larger than 2 is issued, for example, even when such an interrupt request having a default value 3, since the output of the AND gate circuit employed in the circuit $C_{102}$ becomes "0", there is no change in the interrupt vector outputted from the final-staged circuit $C_7$. This fact is similarly applied to another case that an interrupt request having another default value is issued (involving such a case that a plurality of interrupt requests are issued). As previously described, the interrupt vector corresponding to such an interrupt request input, the default priority order of which has a top priority order, is outputted from the final-staged circuit $C_7$. However, when an interrupt request having a default value smaller than 2, for example, a default value 0, or 1 is issued, since the default priority order is high, the interrupt vector outputted from the final-staged circuit $C_7$ is changed.

As previously explained, in accordance with the second embodiment, the internal circuits of the default interrupt priority order judging/interrupt vector generating circuit, as indicated in FIG. 6, FIG. 7, and FIG. 8, perform both the priority order judging operation based on the default value and the interrupt vector generating operation at the same time.

As previously described, in accordance with this second embodiment, the process operation of the IF stage, the process operation of the PRI stage, the process operation of the VCT stage, and also the process operation of the EXT stage are carried out in the pipeline processing manner. At the EXT stage, the interrupt factor is outputted to the processor in response to the interrupt request whose interrupt level is judged as the top priority order at the PRI stage. In addition, the interrupt vector is generated based upon such an interrupt request whose priority order is judged as a top priority order by considering the default value applied to the interrupt request input at the EXT stage in response to the interrupt request selected at the PRI stage based on the priority order of the interrupt request input. As a consequence, even in such a case that a plurality of interrupt requests compete with each other, and these plural interrupt requests are selected by the priority orders arbitrarily applied to a large number of interrupt request inputs, only single interrupt request can be entered into the processor.

Apparently, the present invention is not limited to the above-described embodiments, but may be modified without departing from the technical scope and spirit of the invention. For instance, the pipeline process operations for the respective stages may be carried out every time a plurality of clocks are received.

As previously described in detail, the information processing apparatus of the present invention is accomplished by employing the means/method capable of executing the pipeline process operation as to the holding operation of the interrupt flag, the judging operation of the interrupt level, the judging operation of the interrupt priority orders, the generating operation of the interrupt vector, and furthermore the outputting operation of the interrupt vector. When the multiple interrupt processing operation by the interrupt requests to which the priority orders are applied is carried out, the interrupt response characteristic with respect to the interrupt request having the high priority order can be increased, and furthermore, the interrupt processing efficiency by the processor can be improved.

Moreover, the information processing apparatus of the present invention is accomplished by employing the means/method capable of executing the pipeline process operation as to the holding operation of the interrupt flag, the judging operation of the interrupt level, the judging operation of the interrupt priority orders, the generating operation of the interrupt vector, and furthermore the outputting operation of the interrupt vector. These operations are executed every 1 clock, respectively. Therefore, the interrupt response characteristic for the interrupt request having the high priority order can be increased with respect to the interrupt requests to which the priority orders are applied. Also, it is possible to avoid such a competitive relationship between the interrupt requests having the same priority orders.

It is thus apparent that the present invention is not limited to the above embodiments but may be changed and modified without departing from the scope and spirit of the invention.

Finally, the present application claims the priority of Japanese Patent Application No. Hei10-023244 filed on February 4, which is herein incorporated by reference.

What is claimed is:

1. An interrupt control method used in an information processing method, comprising:

a first step that holds a plurality of flags indicative of interrupt factors with respect to the respective plural interrupt request inputs and also holds a plurality of interrupt levels representative of priority orders of said interrupt request inputs;

a second step that judges such an interrupt level having a top priority order by checking said held interrupt levels to thereby hold such an interrupt factor having said judged interrupt level, and also outputs an interrupt request to a processor of an information processing apparatus;

a third step that generates and holds an interrupt vector in response to said held interrupt factor; and a fourth step that outputs said held interrupt vector to said processor; wherein:

said first to fourth steps are carried out in a pipeline processing manner so as to control the interrupt requests with respect to said processor, whereby when an interrupt request having a higher interrupt level than that of an interrupt request under process, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said second step and then restarts the interrupt process operation for said lower interrupt level.

2. An interrupt control method according to claim 1 wherein:

said first to fourth steps are carried out in the pipeline processing manner every 1 clock.

3. An interrupt control method according to claim 1, further comprising:

a fifth step for holding an interrupt level of an interrupt request under process by said processor, and also for clearing an interrupt level of such an interrupt request, which has been processed by said processor when an interrupt request acknowledge signal is applied from said processor; wherein:

in said second step, such an interrupt request having a top priority order is judged among said plural interrupt requests having the interrupt levels, which are held in said first step, except for an interrupt request having an interrupt level lower than that of the interrupt request under process by said processor.

4. An interrupt control method used in an information processing method, comprising:

a first step for holding a plurality of flags indicative of interrupt factors with respect to the respective plural interrupt request inputs and also for holding a plurality of interrupt levels representative of priority orders of said interrupt request inputs;

a second step for judging such an interrupt level having a top priority order by checking said held interrupt levels to thereby hold such an interrupt factor having said judged interrupt level, and also for outputting an interrupt request to a processor of an information processing apparatus;

a third step for judging priority orders based upon default values indicative of sequence numbers of the interrupt request inputs with respect to said held interrupt factors, and also for generating an interrupt vector in response to such an interrupt factor having a top priority order to thereby hold said generated interrupt vector; and a fourth step for outputting said held interrupt vector to said processor; wherein:

said first to fourth steps are carried out in a pipeline processing manner so as to control the interrupt requests with respect to said processor, whereby when an interrupt request having a higher interrupt level than that of an interrupt request under process, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said second step and then restarts the interrupt process operation for said lower interrupt level.

5. An interrupt control method according to claim 4 wherein:

said first to fourth steps are carried out in the pipeline processing manner every 1 clock.

6. An interrupt control method according to claim 4, further comprising:

a fifth step for holding an interrupt level of an interrupt request under process by said processor, and also for clearing an interrupt level of such an interrupt request, which has been processed by said processor when an interrupt request acknowledge signal is applied from said processor; wherein:

in said second step, such an interrupt request having a top priority order is judged among said plural interrupt requests having the interrupt levels, which are held in said first step, except for an interrupt request having an interrupt level lower than that of the interrupt request under process by said processor.

7. An interrupt control apparatus used in an information processing apparatus, comprising:

interrupt flag holding means for holding a plurality of flags indicative of interrupt factors with respect to the respective plural interrupt request inputs and also for holding a plurality of interrupt levels representative of priority orders of said interrupt request inputs;

interrupt level judging means for judging such an interrupt level having a top priority order by checking said held interrupt levels to thereby hold such a held interrupt factor having said judged interrupt level, and also for outputting an interrupt request to a processor of said information processing apparatus;

interrupt vector generating means for generating an interrupt vector in response to said held interrupt factor; and interrupt vector holding means for holding and outputting said generated interrupt vector to said processor; wherein:

the processing operations by all of said means are carried out in a pipeline processing manner so as to control the interrupt requests with respect to said processor, whereby when an interrupt request having a higher interrupt level than that of an interrupt request under process, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said interrupt level judging means and then restarts the interrupt process operation for said lower interrupt level.

8. An interrupt control apparatus according to claim 7 wherein:

the processing operations by all of said means are carried out in the pipeline processing manner every 1 clock.

9. An interrupt control apparatus according to claim 7, further comprising:

interrupt level holding means for holding an interrupt level of an interrupt request under process by said processor, and also for clearing an interrupt level of such an interrupt request, which has been processed by said processor when an interrupt request acknowledge signal is applied from said processor; wherein:

said interrupt level judging means is arranged in such a way that an interrupt request having a top priority order is judged among said plural interrupt requests having the interrupt levels, which are held in said interrupt level holding means, except for an interrupt request having an interrupt level lower than that of the interrupt request under process by said processor.

10. An interrupt control apparatus used in an information processing apparatus, comprising interrupt flag holding means for holding a plurality of flags indicative of interrupt factors with respect to the respective plural interrupt request inputs and also for holding a plurality of interrupt levels representative of priority orders of said plural interrupt request inputs;

interrupt level judging means for judging such an interrupt level having a top priority order by checking said held interrupt levels to thereby hold such an interrupt factor having said judged interrupt level, and also for outputting an interrupt request to a processor of said information processing apparatus;

default priority order judging/interrupt vector generating means for judging priority orders based upon default values indicative of sequence numbers of the interrupt request inputs with respect to said held interrupt factors, and also for generating an interrupt vector in response to such an interrupt factor having a top priority order to thereby hold said generated interrupt vector; and interrupt vector outputting means for outputting said held interrupt vector to said processor; wherein:

the process operations by all of said means are carried out in a pipeline processing manner so as to control the interrupt requests with respect to said processor, whereby when an interrupt request having a higher interrupt level than that of an interrupt request under execution, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said interrupt level judging means and then restarts the interrupt process operation for said lower interrupt level.

11. An interrupt control apparatus according to claim 10 wherein:

the processing operations by all of said means are carried out in the pipeline processing manner every 1 clock.

12. An interrupt control apparatus according to claim 10, further comprising:

interrupt level holding means for holding an interrupt level of an interrupt request under process by said processor, and also for clearing an interrupt level of such an interrupt request, which has been processed by said processor when an interrupt request acknowledge signal is applied from said processor; wherein:

said interrupt level judging means is arranged in such a way that an interrupt request having a top priority order is judged among said plural interrupt requests having the interrupt levels, which are held in said interrupt level holding means, except for an interrupt request having an interrupt level lower than that of the interrupt request under process by said processor.

13. An interrupt control apparatus according to claim 10 wherein:

said default priority order judging/interrupt vector generating means is arranged by at least a first circuit group, a second circuit group, and a third circuit group; and interrupt request input series are connected to an input of said first circuit group and arranged in such a manner that the priority orders of the default values are sequentially changed, whereby:

an interrupt vector corresponding to such an interrupt request having a top priority order of a default value among the default values of said interrupt request input series is outputted from a final stage of said third circuit group as a signal having a bit number corresponding to a total input number of said interrupt request input series.

14. An interrupt control apparatus according to claim 13 wherein:

said first circuit group is comprised by arranging first circuits in the order of the default values of said interrupt request inputs; and each of said first circuits includes a first OR gate circuit for OR-gating two interrupt request inputs having default inputs having default values adjacent to each other, and a first AND gate circuit for AND-gating said two interrupt request inputs;

said second circuit group comprises second circuits each including a second OR gate circuit for OR-gating said two interrupt requests OR-gated by two sets of said first adjoining OR gate circuits employed in said first circuit group, a second AND gate circuit for AND-gating said two interrupt requests AND-gated by two sets of said first adjoining AND gate circuits, and also a first selector for selecting one of the interrupt requests AND-gated by said two first adjoining AND gate circuits to output an AND-gated interrupt request having a higher priority order in response to the output from said first OR gating circuit; and such a second circuit for outputting signals in a parallel manner, while defining the output from said second AND gate circuit as an upper digit of outputted signals from said second circuit and the output from said first selector as a lower digit thereof is connected to the output of said first circuit group; and said third circuit group comprises third circuits each including a third OR gate circuit for OR-gating said two interrupt requests OR-gated by two sets of said second adjoining OR gate circuits employed in said second circuit group, a third AND gate circuit for AND-gating said two interrupt requests AND gated by two sets of said second adjoining AND gate circuits, and also a second selector for selecting one of the interrupt requests AND-gated by said two second adjoining AND-gate circuits to output signals containing the AND-gated output of said two second AND gate circuits as an upper digit thereof and the output of said first selector as a lower digit thereof in response to an OR-gated interrupt request having a higher priority order; and such a third circuit for outputting signals in a parallel manner, while defining the output from said third AND gate circuit as an upper digit of outputted signals from said third circuit and the output from said second selector as a lower digit thereof is connected to the output of said first circuit group in a reverse tree-structure.

15. An interrupt control apparatus used in an information processing apparatus, comprising:

an interrupt flag holding circuit that holds a plurality of flags indicative of interrupt factors with respect to the respective plural interrupt request inputs and also holds a plurality of interrupt levels representative of priority orders of said interrupt request inputs;

an interrupt level judging circuit that judges such an interrupt level having a top priority order by checking said held interrupt levels to thereby hold such a held interrupt factor having said judged interrupt level, and also for outputting an interrupt request to a processor of said information processing apparatus;

an interrupt vector generating circuit that generates an interrupt vector in response to said held interrupt factor; and an interrupt vector holding circuit for holding and outputting said generated interrupt vector to said processor, wherein processing operations by all of said circuits are carried out in a pipeline processing manner so as to control the interrupt requests with respect to said processor, whereby when an interrupt request having a higher interrupt level than that of an interrupt request under process, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said interrupt level judging circuit and then restarts the interrupt process operation for said lower interrupt level.

16. An interrupt control apparatus used in an information processing apparatus, comprising:

an interrupt flag holding circuit that holds a plurality of flags indicative of interrupt factors with respect to the respective plural interrupt request inputs and also holds a plurality of interrupt levels representative of priority orders of said interrupt request inputs;

an interrupt level judging circuit that judges such an interrupt level having a top priority order by checking said held interrupt levels to thereby hold such an interrupt factor having said judged interrupt level, and also outputs an interrupt request to a processor of said information processing apparatus;

a default priority order judging/interrupt vector generating circuit that judges priority orders based upon default values indicative of sequence numbers of the interrupt request inputs with respect to said held interrupt factors, and also generating an interrupt vector in response to such an interrupt factor having a top priority order; and an interrupt vector holding circuit that holds and outputs said generated interrupt vector to said processor; wherein the process operations by all of said circuits are carried out in a pipeline processing manner so as to control the interrupt requests with respect to said processor, whereby when an interrupt request having a higher interrupt level than that of an interrupt request under execution, having a lower interrupt level, is issued, said processor interrupts the interrupt process operation under execution and then executes an interrupt process operation for said higher interrupt level, whereas when said interrupt process operation for said higher interrupt level is accomplished, said processor clears the interrupt level held in said interrupt level judging circuit and then restarts the interrupt process operation for said lower interrupt level.

* * * * *